United States Patent [19]
Ooenoki et al.

[11] Patent Number: 5,652,805
[45] Date of Patent: Jul. 29, 1997

[54] BENDING ANGLE DETECTOR AND STRAIGHT LINE EXTRACTING DEVICE FOR USE THEREWITH AND BENDING ANGLE DETECTING POSITION SETTING DEVICE

[75] Inventors: Toshiyuki Ooenoki; Toshiro Otani, both of Hirakata; Shigeru Tokai, Komatsu, all of Japan

[73] Assignee: Kabushiki Kaisha Komatsu Seisakusho, Tokyo, Japan

[21] Appl. No.: 290,877

[22] PCT Filed: May 12, 1994

[86] PCT No.: PCT/JP94/00773

§ 371 Date: Aug. 31, 1994

§ 102(e) Date: Aug. 31, 1994

[87] PCT Pub. No.: WO94/27756

PCT Pub. Date: Dec. 8, 1994

[30] Foreign Application Priority Data

| May 24, 1993 | [JP] | Japan | 5-121739 |
| Jul. 13, 1993 | [JP] | Japan | 5-173286 |
| Dec. 24, 1993 | [JP] | Japan | 5-327656 |

[51] Int. Cl.$^6$ .................................................. G06K 9/00
[52] U.S. Cl. ........................ 382/141; 382/152; 382/258
[58] Field of Search ................................ 382/108, 141, 382/143, 152, 258; 356/376; 348/128, 92

[56] References Cited

U.S. PATENT DOCUMENTS

| 4,564,765 | 1/1986 | Blaich | 250/561 |
| 4,942,618 | 7/1990 | Sumi et al. | 382/154 |
| 5,046,852 | 9/1991 | Hametner et al. | 356/376 |
| 5,129,010 | 7/1992 | Higuchi et al. | 382/141 |
| 5,231,678 | 7/1993 | Takatori et al. | 382/258 |
| 5,293,220 | 3/1994 | Fukuda et al. | 356/394 |
| 5,311,289 | 5/1994 | Yamaoka et al. | 382/141 |
| 5,321,766 | 6/1994 | Fraas et al. | 382/152 |
| 5,329,597 | 7/1994 | Kouno et al. | 382/152 |

FOREIGN PATENT DOCUMENTS

| 470263A1 | 2/1991 | European Pat. Off. |
| 54-36758 | 3/1979 | Japan . |
| 59-18408 | 7/1982 | Japan . |
| 59-47024 | 9/1982 | Japan . |
| 59-160707 | 3/1983 | Japan . |
| 59-173716 | 3/1983 | Japan . |
| 59-176611 | 3/1983 | Japan . |
| 59-197813 | 4/1983 | Japan . |
| 63-49327 | 3/1988 | Japan . |
| 1-299711 | 5/1988 | Japan . |
| 2-82106 | 9/1988 | Japan . |
| 64-2723 | 1/1989 | Japan . |
| 1-271013 | 10/1989 | Japan . |
| 1-273618 | 11/1989 | Japan . |
| WO92/05892 | 4/1991 | WIPO . |

*Primary Examiner*—Leo Boudreau
*Assistant Examiner*—Chris Kelley
*Attorney, Agent, or Firm*—Nikaido Marmelstein Murray & Oram LLP

[57] ABSTRACT

In bending angle detection, a linear projected light image formed on the surface of a workpiece is photographed by a photographing device; the actual inclination angle of a specimen is stored as data in correspondence with the inclination angle and position of the specimen in an image; and the bending angle of the workpiece is obtained by accessing the data, with the inclination angle and position of the linear projected light image in an image produced by photographing. In main straight line extraction, main pixels are obtained from the distribution of the brightness of pixels aligned on specified axes and a main straight line is obtained from a plurality of main pixels. For extracting only a necessary straight line from an image including unnecessary straight lines, the photographing device is so disposed as to photograph a lower bender and a second straight line from the bottom end of the image is extracted. In setting a bending angle detecting position, a potential bending step where the bending angle detection of the workpiece might be performed is calculated from simulation data on the bending state of the workpiece in each bending step.

19 Claims, 24 Drawing Sheets

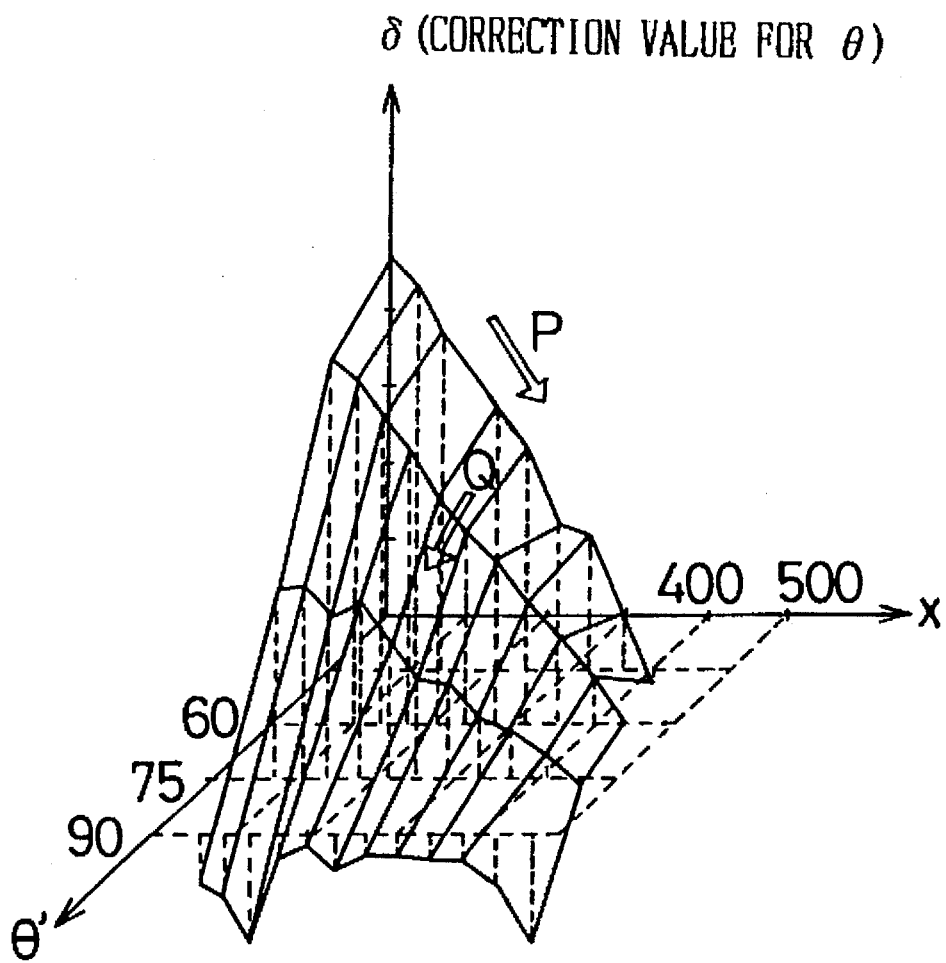
F I G. 8

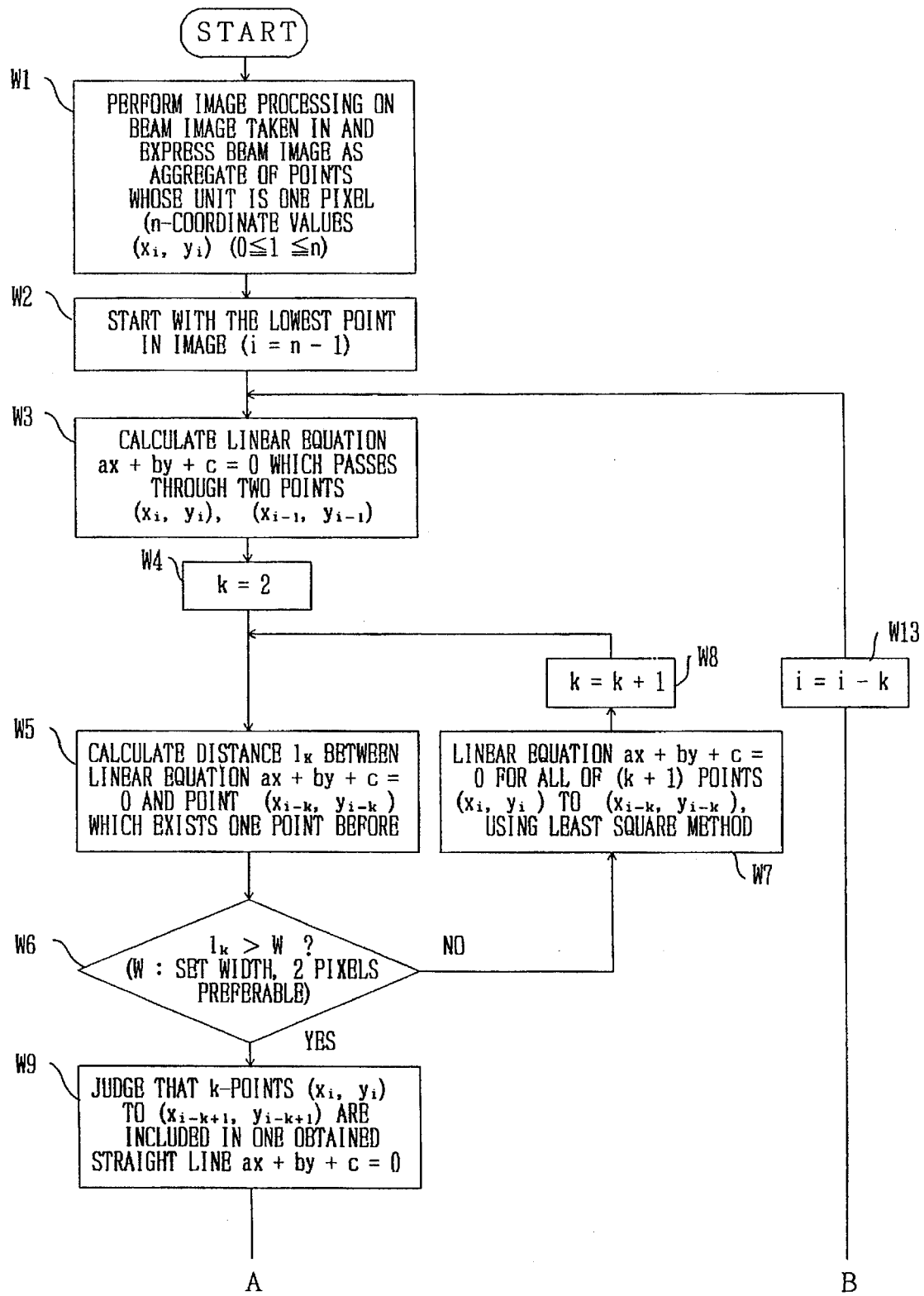
FIG. 22/1

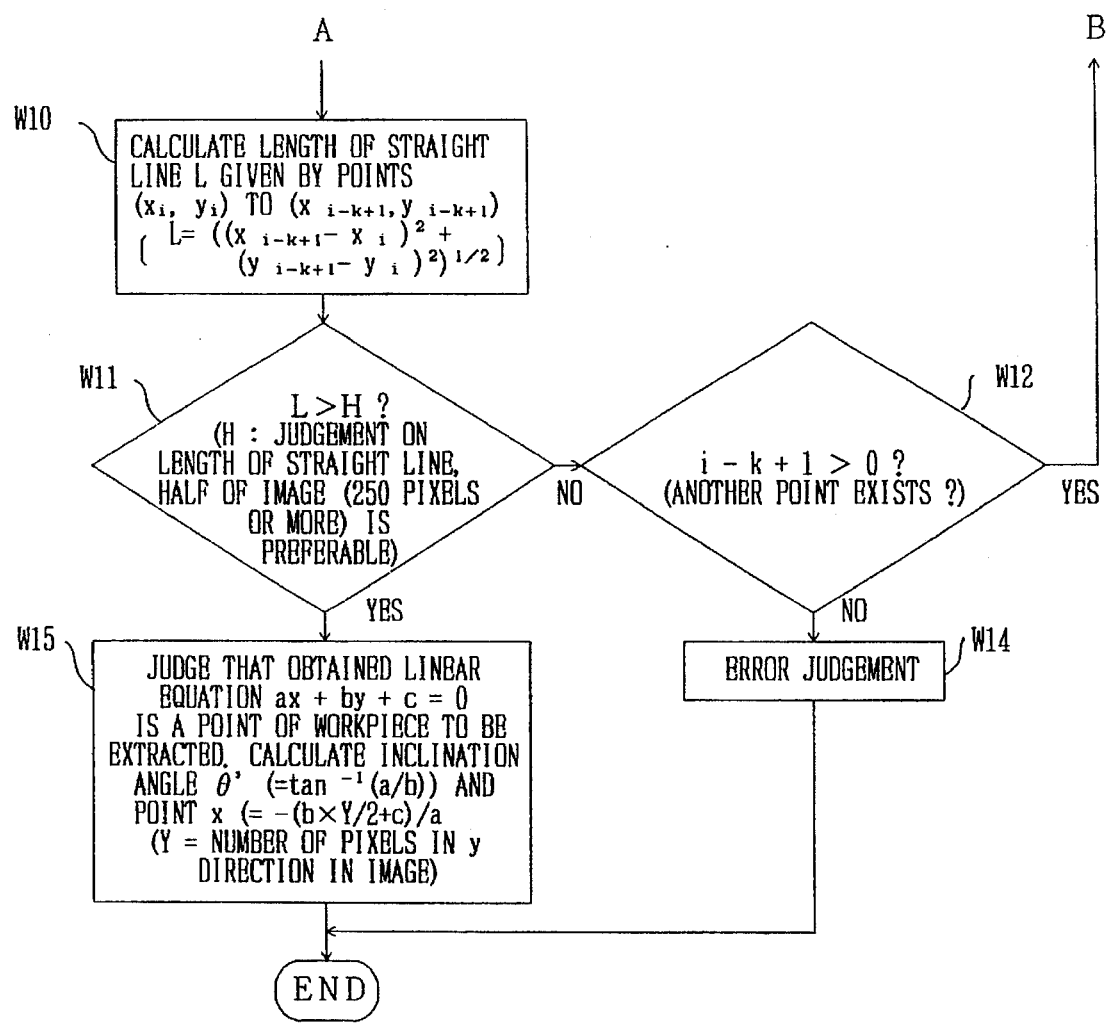
FIG. 22/2

| | STEP NO. | BENDING PROCESSES |
|---|---|---|
| FIG.24(a) | 1 | 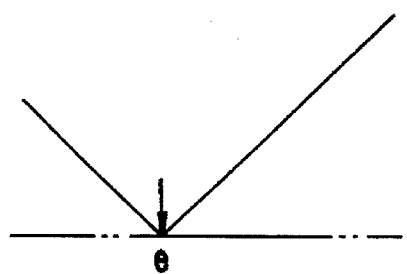 |
| FIG.24(b) | 2 | |
| FIG.24(c) | 3 | 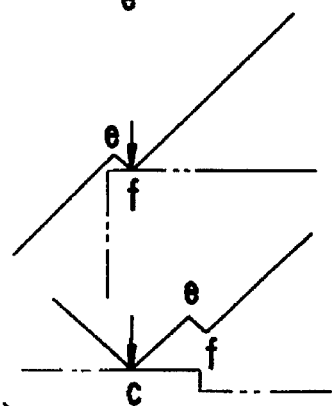 |
| FIG.24(d) | 4 | |
| FIG.24(e) | 5 | 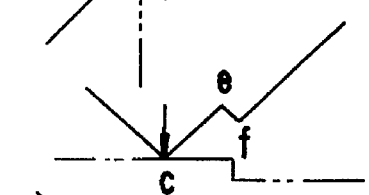 |
| FIG.24(f) | 6 | 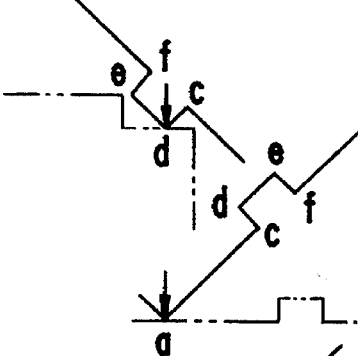 |
| FIG.24(g) | 7 |  |
| FIG.24(h) | 8 |  |

BENDING ANGLE DETECTOR AND STRAIGHT LINE EXTRACTING DEVICE FOR USE THEREWITH AND BENDING ANGLE DETECTING POSITION SETTING DEVICE

FIELD OF THE INVENTION

The present invention relates to a bending angle detector for detecting a bending angle when a sheet-like workpiece is bent to a specified angle; a straight line extracting device for use with the bending angle detector; and a bending angle detecting position setting device for setting a detecting position when detecting a bending angle of a workpiece.

BACKGROUND OF THE INVENTION

There have been conventionally known the following bending angle detectors incorporated in bending machines such as press brakes.

(a) Contact type detectors which detect a bending angle of a workpiece, bringing a probe into contact with an inclined surface of the workpiece (e.g., Japanese Patent Publication Laid-Open No. 1-273618 (1989)).

(b) Non-contact type detectors which include a plurality of distance sensors such as overcurrent sensors, electrostatic capacity sensors or optical sensors and which detect a bending angle of a workpiece by measuring the difference between the distances from the respective distance sensors to the workpiece (e.g., Japanese Patent Publication Laid-Open No. 63-49327 (1988), Japanese Patent Publication Laid-Open No. 64-2723 (1989), Japanese Patent Publication Laid-Open No. 1-271013 (1989)).

These bending angle detectors however present the following drawbacks.

Firstly, the contact-type detectors cannot be suitably used when detecting a bending angle of a workpiece with short legs, as these detectors require comparatively long legs to ensure a high measuring accuracy. Further, if the contact type detectors are used for a long time, long contact with workpieces causes the probe to be worn and deformed, resulting in a decreased measuring accuracy.

In the case of the non-contact type detectors, a plurality of distance sensors are employed for measuring and calculating the distance from each sensor to a bent workpiece, but a long space cannot be kept between one sensor and another so that a satisfactory detecting accuracy cannot be obtained. Further, the non-contact type detectors employing overcurrent sensors or electrostatic capacity sensors have the disadvantage that since the outputs of these sensors vary depending on the material of a workpiece to be measured, so that measuring conditions have to be changed whenever a different material is used. The non-contact type detectors employing optical sensors also have the disadvantage that light directed to the surface of a workpiece disperses in some surface conditions, which leads to an increased measuring error and a decreased measuring accuracy. Another disadvantage of this type is that the measuring accuracy is dependent on sensors to be used and the resolving power of the image receptor.

One proposal to overcome the foregoing drawbacks is set out in Japanese Patent Publication Laid-Open No. 4-145315 (1992) where a slit light or two spot lights are directed onto the surface of a workpiece and a light image formed on the surface of the workpiece is photographed by a photographing means to detect a bending angle through image processing. In this bending angle detector, an optical system is arranged such that, as shown in FIG. 28, the optical axis of incident light upon the photographing means (i.e., camera) lies within a plane perpendicular to the irradiated surface of the workpiece W. In this arrangement, the following equations hold:

$$\tan\theta' = d/l \tag{a}$$

$$\tan\theta = h/l \tag{b}$$

$$\tan\alpha = d/h \tag{c}$$

where $\alpha$ is a beam projecting angle, i.e., the angle at which a slit light (or two spot lights) is directed onto the surface of the workpiece W; $\theta'$ is the angle formed by the slit light in an image plane; $\theta$ is a bending angle of the workpiece W (hereinafter referred to as "work angle"); and d, h, l respectively represent the lengths shown in FIG. 28.

From Equations (a), (b) and (c), the following equation (d) is obtained.

$$\tan\theta' = d/l = d/h \times h/l = \tan\alpha \times \tan\theta \tag{d}$$

In Equation (d), since the beam projecting angle $\alpha$ is given, the work angle $\theta$ can be obtained by arithmetic operation if the angle $\theta'0$ is detected by image processing.

As one example of the image processing technique, a device which linearizes image using the linear least square method is disclosed in Japanese Patent Publication Laid-Open No. 4-62683 (1992). In this processing device, a straight line component is extracted from a binary image. More specifically, the number of pixels constituting a binary image is reduced without spoiling the straight line approximation characteristics of the binary image, and the straight line component of the binary image is extracted based on the number of remaining pixels.

An alternative proposal is disclosed in Japanese Patent Publication No. 4-70091 (1992) where a bending angle detector attached to a press brake is freely movable so that it can be positioned at a desired position when detecting a bending angle of a workpiece.

However, the bending angle detector according to the first proposal suffers from several disadvantages. Firstly, it has been proved that it is difficult to accurately calculate the work angle $\theta$ from Equation (d), since the field of a camera serving as the photographing means is spread because of the angle of view of the lens. That is, the relationship between the work angle $\theta$ and the angle $\theta'$ formed by the slit light in the image plane is not so simple as Equation (d) when taking the effects of the angle of view of the lens into consideration. In order to calculate the work angle $\theta$ more accurately, it is necessary to use a function $F(\alpha, l_a, f, w \ldots)$ which involves optical conditions such as the distance $l_a$ between the camera and the workpiece, the focal length f of the lens and the dimension of the image receptor w. In this case, Equation (d) is expressed as follows.

$$\tan\theta' = F(\alpha, l_a, f, w \ldots) \times \tan\theta \tag{e}$$

For calculating the work angle $\theta$ from Equation (e), a mathematical method may be used to obtain the function F $(\alpha, l_a, f, w \ldots)$, but in such a case, variations in parameters in individual members such as a lens cannot be taken into account and this results in an increased error. Therefore, various parameters in each member should be obtained through experiments. However, it is extremely difficult to carry out rigorous measurement in an optical system. Further, since the distance $l_a$ between the camera and the workpiece, which is one of the parameters, varies according bending processing conditions (die size, the thickness of a sheet-like workpiece, etc.), a specialized means is required for measuring the distance $l_a$, which brings about a complexity in the mechanism.

Another problem lies in the process in which an image (a linear projected light image) formed on the surface of the workpiece is photographed by the photographing means and image processing is carried out. In the measurement of the image at the job site, an optimum threshold for binary conversion fluctuates due to the influence of external light and the instability of the light source, so that the shape of the bright zone after the binary conversion varies whenever measurement is carried out. Further, unevenness in the color of the surface of a workpiece or rolling traces inherent to steel plates often cause irregular reflection of beams. This irregular reflection leads to such undesirable situations that (i) the bright zone does not assume the shape of a straight line, (ii) the edge becomes rugged, or (iii) holes B are formed in the bright zone A as shown in FIG. 29, and in these situations, it is difficult to obtain a satisfactorily thin linear image. As a result, the image C which has been thinned by image processing has wavy portions or whisker-like portions (short lines) D which are the cause of errors in extracting a main straight line.

Still another problem arises when a workpiece which has a bent portion is bent. In practical bending processing in which a workpiece is bent with upper and lower dies, a workpiece to be photographed is not always in the form of a flat sheet. When the bending processing is applied to a workpiece having a bent portion, there is a likelihood that the bent portion and/or a part of the lower die are also photographed by the camera. If binary conversion and image thinning process are performed on such an image, an error will be caused in the position of the center of gravity and the inclination of the image.

In spite of the fact that detection of a bending angle of a workpiece by the use of a bending angle detector is difficult or impossible in some cases, for example, where a workpiece of a particular shape is used or a finished article of a particular shape is required, conventional NC devices are not designed to deal with such data concerning the bending angle detector as control data. Therefore, in a bending machine equipped with such a bending angle detector, control operation is difficult to be carried out by means of an NC device,

SUMMARY OF THE INVENTION

The present invention has been made with the above-described problems in view and therefore one of the objects of the invention is to provide a bending angle detector capable of accurately detecting a bending angle of a workpiece, without involving complicated calculations and causing a complexity in the mechanism.

Another object of the invention is to provide a straight line extracting device for use with the above bending angle detector, the straight line extracting device being capable of extracting a main straight line from a linear image with high accuracy.

Still another object of the invention is to provide a straight line extracting device for use with the above bending angle detector, the straight line extracting device being capable of extracting only a required straight line from an image even if the image includes other images than the image of a workpiece.

A further object of the invention is to provide a bending angle detecting position setting device capable of smoothly setting a bending angle detecting position when a bending angle of a workpiece is detected by the bending angle detector.

In accomplishing these and other objects, there has been provided, in accordance with the present invention, a bending angle detector wherein a bending angle of a workpiece is detected by image processing, comprising:

(a) projecting means for projecting light onto the workpiece at a specified projecting angle to form a linear projected light image on the surface of the workpiece;

(b) photographing means for photographing the surface of the workpiece on which the linear projected light image has been formed by the projecting means;

(c) projected light image detecting means for detecting the inclination angle and position of the linear projected light image in an image produced by the photographing means;

(d) memory means for storing data on the actual inclination angle of a specimen in correspondence with the inclination angle and position of the specimen in an image produced by the photographing means, the actual inclination angle being preliminarily given; and (e) calculating means for obtaining, by arithmetic operation, the bending angle of the workpiece by accessing the data stored in the memory means, using the inclination angle and position of the linear projected light image detected by the projected light image detecting means.

According to the above described bending angle detector, the projecting means projects a linear projected light image at a specified angle onto the surface of a workpiece which is to be bent at a desired angle; this linear projected light image is photographed by the photographing means; and the inclination ankle and position of the linear projected light image in the image produced by the photographing means are detected. On the other hand, a specimen having a given inclination angle is photographed by the photographing means and the memory means stores data on the actual inclination angle of the specimen in conjunction with the corresponding inclination angle and position in an image produced by the photographing means. By accessing the stored data with the inclination angle and position of the linear projected light image detected by the projected light image detecting means, the calculating means calculates the bending angle of the workpiece. With such an arrangement, a bending angle of a workpiece can be accurately calculated without involving complicated arithmetic operation, and based on the result of the calculation, the upper and lower dies of the bending machine are controlled, thereby achieving high-accuracy bending processing.

The data stored in the memory means may be a correction value for the actual inclination angle of the specimen, the correction value being arranged in correspondence with the inclination angle and position of the specimen in the image produced by photographing, or may be the actual inclination angle of the specimen itself arranged in the same manner as described above.

The calculating means preferably calculates the bending angle of the workpiece by interpolating the data stored in the memory means. This enables it to obtain the bending angle of the workpiece with high accuracy.

The projecting means and the photographing means may be disposed at at least one side of the bending line of the workpiece. The provision of a set of these means at both sides of the bending line increases the detection accuracy of the bending angle detector.

The projecting means may form a linear projected light image on the surface of a workpiece by projecting a slit light or a plurality of aligned spot lights.

According to the invention, there is provided a straight line extracting device for use with a bending angle detector, which extracts a main straight line from a bright zone of a gray-scale image, comprising:

(a) brightness detecting means for detecting the brightness of each of pixels which constitute the gray-scale image;

(b) main pixel calculating means for (i) performing arithmetic operation on a specified scanning axis in an image coordinate system, to obtain a main pixel associated with the optical axis of the bright zone from the distribution of the brightness of the pixels aligned on the scanning axis detected by the brightness detecting means and (ii) repeatedly performing the arithmetic operation on other scanning axes which are arranged at specified intervals, whereby a plurality of main pixels are obtained; and (c) main straight line calculating means for obtaining the main straight line of the bright zone from a plurality of main pixels obtained by the main pixel calculating means.

According to the above straight line extracting device, the brightness of each of the pixels constituting a gray-scale image is detected by the brightness detecting means and a main pixel associated with the optical axis of the bright zone of the gray-scale image is obtained from the distribution of the brightness of the pixels, by performing an arithmetic operation on a specified scanning axis in an image coordinate system. This arithmetic operation is repeatedly performed on other scanning axes which are arranged at predetermined intervals, so that a plurality of main pixels can be obtained. From a plurality of main pixels thus obtained, the main straight line of the bright zone can be calculated. Accordingly, the gray-scale image is processed without carrying out binary conversion, so that a main straight line can be accurately extracted without being affected by the fluctuation of an optimum threshold etc.

The straight line component extracting means may include noise eliminating means which eliminates noise from the gray-scale image prior to the detection of the brightness of each pixel by the brightness detecting means. The provision of the noise eliminating means increases accuracy in the extraction of the main straight line.

The noise eliminating means may eliminate noise in one of the following ways: (i) noise is eliminated by subtracting the brightness of pixels before gray-scale image formation from the brightness of pixels after gray-scale image formation; (ii) noise is eliminated by making brightness values, which are below a specified threshold, zero; and (iii) noise is eliminated by making the brightness values of isolated pixels zero, these isolated pixels having adjacent pixels whose brightness values are zero.

The main pixel calculating means obtains a main pixel in one of the following methods: (i) a pixel having the highest brightness from pixels aligned on a specified scanning axis is set as the main pixel; (ii) the barycenter in the brightness distribution of pixels on a specified scanning axis is obtained and set as the main pixel; and (iii) from the distribution of the brightness of pixels on a specified scanning axis, the half-width of each brightness is obtained and the central value of the obtained half-width values is set as the main pixel.

The main straight line calculating means may calculate a main straight line by obtaining an approximate straight line from a plurality of main pixels, using the least square method. More specifically, the calculation is performed in such a way that a specified width is allowed to an approximate straight line, thereby determining a specified straight line region; then, the remotest pixel from the straight line region is eliminated; and the calculation for obtaining an approximate straight line is repeatedly performed based on the remaining pixels until all the pixels are included in a straight line region.

According to the invention, there is provided another straight line extracting device for use with a bending angle detector, comprising:

(a) projecting means for projecting, at a specified projecting angle, light onto a workpiece and onto a part of a lower bender on which the workpiece is placed, such that a linear projected light image is formed on the surfaces of the workpiece and the lower bender;

(b) photographing means for photographing the surfaces of the workpiece and the lower bender on which the linear projected light image has been formed by the projecting means;

(c) point sequence forming means for performing binary conversion and image thinning process on an image produced by the photographing means, thereby forming a sequence of points which is representative of the image and whose unit is a pixel;

(d) straight line component extracting means for extracting a straight line component associated with the image of the workpiece from the sequence of points obtained by the point sequence forming means, said straight line component being linked to a straight line component associated with the image of the lower bender; and (e) projected light image detecting means for detecting the inclination angle and position of the linear projected light image of the workpiece in the image produced by the photographing means, based on the straight line component extracted by the straight line component extracting means.

According to the above straight line extracting device, the projecting means projects, at a specified angle, light onto the surfaces of the workpiece and the lower die to form a linear projected light image thereon, and this linear projected light image is photographed by the photographing means. Then, the photographed image is converted into binary form and thinned by the point sequence forming means, whereby the image is expressed as a sequence of points, whose unit is a pixel. Extracted from the sequence of points thus obtained is a straight line component which is associated with the image of the workpiece and which is linked to a straight line component associated with the image of the lower bender. Based on the straight line component thus extracted, the inclination angle and position of the linear projected light image of the workpiece in the image photographed are detected. With such an arrangement, even if a workpiece which has been already bent is further bent or even if an image of other parts than a workpiece is included in the photographed image, a required straight line alone can be extracted. This leads to an increased accuracy in the measurement of a bending angle during bending processing and a higher processing speed.

Preferably, the point sequence forming means eliminates points at predetermined intervals and expresses the image by a set of remaining points.

Preferably, the straight line component extracting means identifies a straight line lying at the bottom end of the image plane of the photographing means as the straight line component associated with the image of the lower bender. In this case, a straight line connecting a first point existing at the bottom end of the image plane and a second point which is adjacent to the first point is firstly obtained, and a specified width is allowed to this straight line, thereby determining a straight line region. If a third point adjacent to the second point lies within the straight line region, the arithmetic operation is again performed for obtaining a straight line including the third point. The arithmetic operation is repeated in this way until a point which is out of a straight line region appears, and when such a point appears, a line segment between the first point and the point just before the point which is out of a straight line region is determined as the straight line component associated with the image of the workpiece and this straight line component is extracted. In the case where the line segment includes only two points aligned, this segment may be eliminated as an unnecessary part.

Preferably, the projecting means and the photographing means are disposed at at least one side of the bending line of the workpiece, and the provision of a set of these means at both sides of the bending line increases detection accuracy.

The projecting means may form a linear projected light image on the surfaces of the workpiece and the lower bender by projecting a slit light or a plurality of aligned spot lights.

According to the invention, there is provided a bending angle detecting position setting device which sets a detecting position when a bending angle of a workpiece is detected by bending angle detecting means, comprising:

(a) simulation data calculating means for obtaining, by arithmetic operation, simulation data associated with the bending state of the workpiece in each bending step from bending processing conditions for the workpiece; and (b) potential bending step calculating means for obtaining, by arithmetic operation, a potential bending step in which the bending angle detection of the workpiece might be performed by the bending angle detecting means, from the simulation data obtained by the simulation data calculating means.

According to the above bending angle detecting position setting device, simulation data associated with the bending state of a workpiece in each bending step can be calculated from bending processing conditions for the workpiece by means of the simulation data calculating means. Based on the simulation data, the potential bending step calculating means obtains a potential bending step in which the bending angle detection of the workpiece might be performed by the bending angle detecting means. This arrangement makes it possible to smoothly set a detecting position where a bending angle of a workpiece is detected and therefore leads to high-accuracy bending processing.

In this case, there may be provided detection pattern memory means which instructs a detecting position where detection can be performed by the bending angle detecting means to the potential bending step obtained by the potential bending step calculating means and which stores the instructed detecting position as a detection pattern for each bending step. This increases speed in instruction when a workpiece is repeatedly processed or a similar workpiece is processed, and as a result, the time required for setting a detecting position can be saved.

Preferably, the simulation data is comprised of the profile of a workpiece in each bending step and various marks created on a workpiece by pretreatment. In this case, the pretreatment marks may include holes, notches, concavities and convexities which are defined on the surface of a workpiece.

Other objects of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIGS. 1 to 10 illustrate one embodiment of a bending angle detector according to the invention;

FIG. 1 is a side view of an essential part of a press brake;

FIG. 2 is a block diagram of an image processing method and ram control method;

FIG. 3 is a view showing the positional relationship among a light source, workpiece and CCD camera;

FIG. 4 is a view of one example of an image;

FIG. 5 is a front view of a calibration system;

FIG. 6 is a plan view of the calibration system;

FIG. 7 is a flow chart showing processes for making a calibration table;

FIG. 8 is a graph showing one example of the calibration table;

FIG. 9 illustrates the interpolation of a correction value for a work angle;

FIG. 10 is a flow chart showing processes for measuring a work angle;

FIGS. 11 to 18 illustrate a first embodiment of a straight line extracting device for use with a bending angle detector, according to the invention;

FIG. 11 is a block diagram;

FIG. 13 is a flow chart of the processing steps;

FIG. 14 shows one example of a main pixel calculation method;

FIG. 15 shows another example of the main pixel calculation method;

FIG. 16 shows still another example of the main pixel calculation method;

FIG. 17 is a flow chart showing the processing steps designed to improve accuracy;

FIG. 18 shows the comparison between the detection accuracy of the main straight line extracting device of the first embodiment and that of a prior art device;

FIGS. 19 to 22 illustrate a second embodiment of the straight line extracting device for use with a bending angle detector, according to the invention;

FIG. 19 illustrates a system arrangement;

FIG. 20 illustrates one example of an image;

FIGS. 22-1–22-2 are flow charts showing the processing steps;

FIGS. 23 to 27 illustrates one embodiment of a bending angle detecting position setting device according to the invention;

FIG. 23 is a block diagram;

FIGS. 24(a)–24(h) illustrate the bending state of a workpiece in each step of bending processing;

FIG. 27 is a flow chart showing setting processes by a bending angle detector;

FIG. 28 is a view showing the relationship among a beam projection angle, an angle at which an image is formed in an image plane and a bending angle;

FIG. 29 is a view of one example of a linear projected light image; and

FIG. 30 is a view of another example of the linear projected light image.

DESCRIPTION OF THE PREFERRED EMBODIMENTS

With reference to the drawings, preferred embodiments of a bending angle detector, a straight line extracting device for use with a bending angle detector, and a bending angle detecting position setting device according to the invention will be hereinafter described.

(1) Bending angle detector

Figure 1:
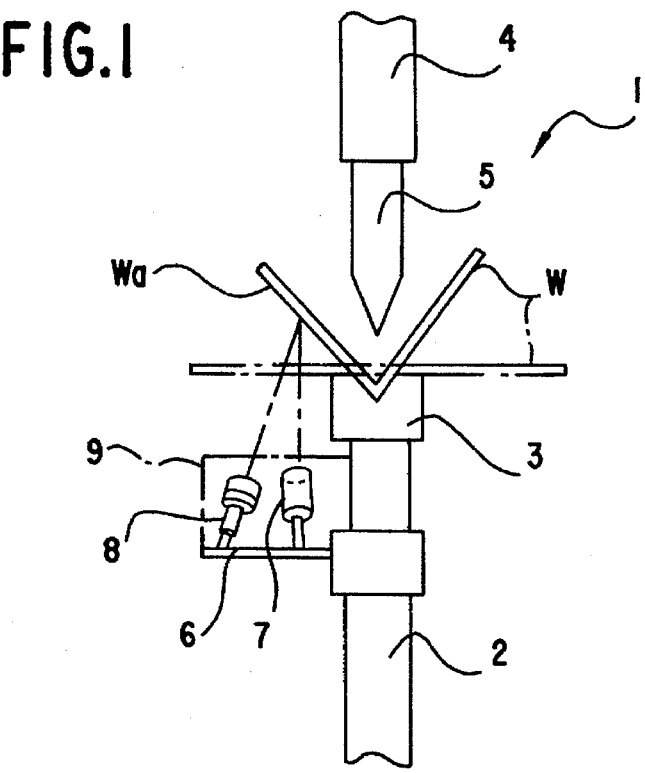

FIG. 1 shows the side view of an essential part of a press brake 1 according to one embodiment of the invention. In this embodiment, the press brake 1 comprises a lower bender (die) 3 supported on a support 2 and an upper bender (punch) 5 attached to the under part of a ram 4 which is opposite to the lower bender 3 and disposed so as to be freely lifted or lowered above the lower bender 3. A workpiece W made of a metal sheet is inserted between the upper bender 5 and the lower bender 3 and the ram 4 is lowered while the workpiece W being placed on the lower bender 3, so that the workpiece W is pinched and pressed by the upper bender 5 and the lower bender 3 and accordingly bending of the workpiece W is performed.

Provided in front of (at the main side of) the support 2 is a bracket 6 on which a measurement unit 9 is disposed. The measurement unit 9 includes a slit-shaped light source 7 for projecting a linear projected light image onto an outer face Wa of the workpiece W and a CCD camera 8 for photographing the linear projected light image formed by the light source 7. This measuring unit 9 may be disposed behind (at the machine side of) the support 2 instead of being disposed in front of the same, or alternatively, both sides may be provided with the measuring unit 9.

Figure 2:
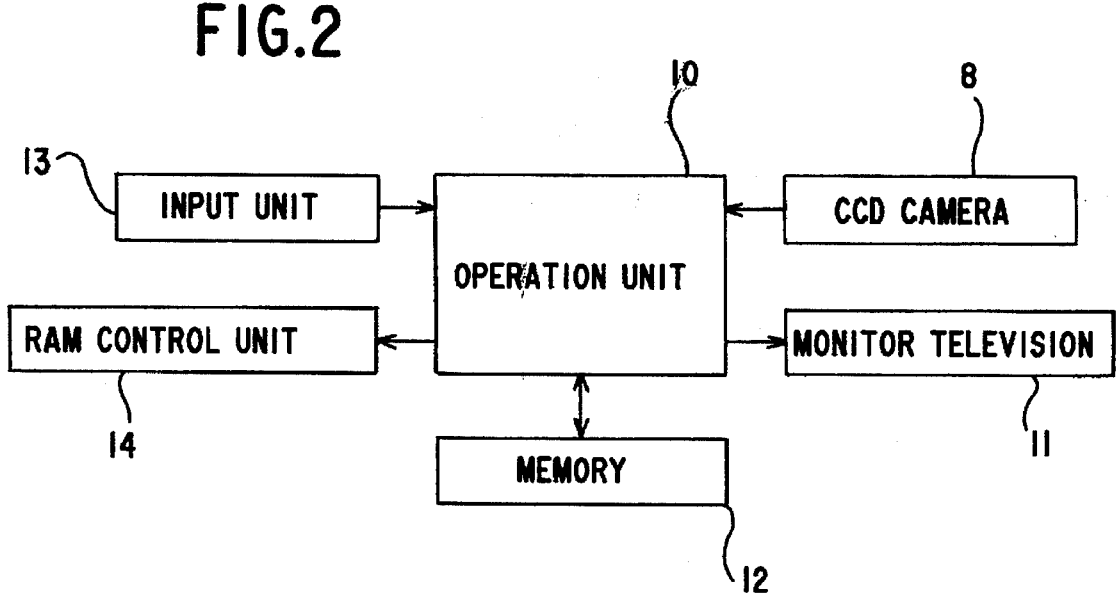

As shown in FIG. 2, an image photographed by the CCD camera 8 is sent to an operation unit 10 and then displayed on a monitor television 11 while being stored as image data in a memory 12. Table data on a calibration table (to be described later) etc., which have been input through an input unit 13 and stored in the memory 12, is added to the image data and based on this data, arithmetic operation is performed in the operation unit 10. By this arithmetic operation, an angle at which the workpiece W is to be bent is obtained. The bending angle thus obtained is supplied to a ram control unit 14 which controls the bottom dead center of the ram 4, whereby the workpiece W is bent at the desired angle.

Figure 3:
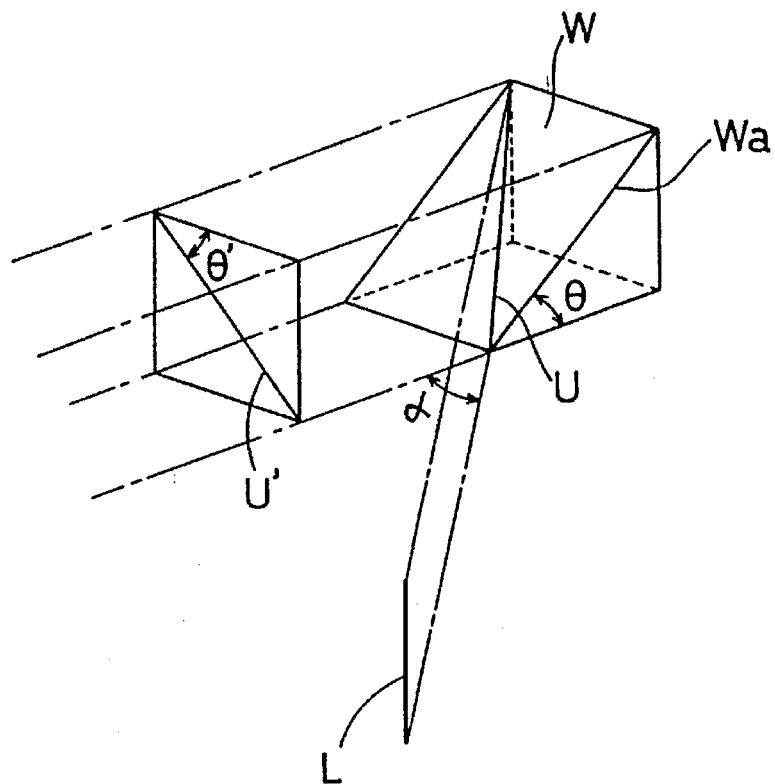

When a slit light L is projected, as shown in FIG. 3, onto the outer face Wa of the workpiece W thereby forming a linear projected light image U thereon and this linear projected light image U is photographed by the CCD camera 8, the relationship which exists among an angle θ' of a linear projected light image U' formed in the image plane of the CCD camera 8, the projecting angle α of the slit light L and the bending angle θ of the workpiece W (=work angle) is described by the following equation. This equation is based on plane projection and the same as the above-mentioned equation (d).

$$\tan\theta' = \tan\alpha \times \tan\theta \quad (1)$$

Figure 4:
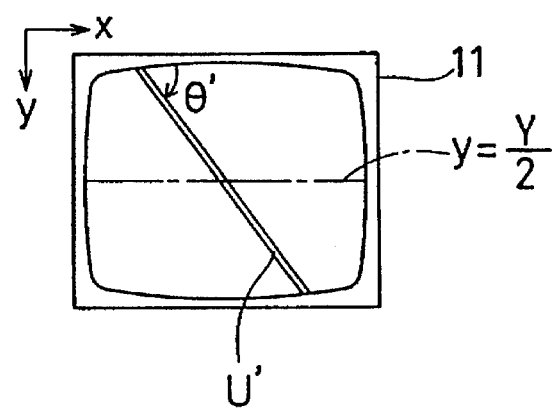

In this equation (1), the angle of view of the lens is not taken into account and, therefore, in this embodiment, the linear projected light image U' displayed on the screen of the monitor television 11 is specified as a straight line by image processing and the relationship between the inclination angle θ' of the straight line in the image plane (i.e., on the screen of the monitor television 11) and the work angle θ is calibrated, using the positional data of the straight line as a parameter. The positional data of the straight line is given by the x coordinate of the intersection of a straight line which is drawn on the center of the screen of the monitor television 11 as shown in FIG. 4 and represented by y=Y/2 (Y is the number of pixels in a direction parallel to the y axis) and the straight line of the linear projected light image U' (e.g., ax+by+c=0).

Figure 5:
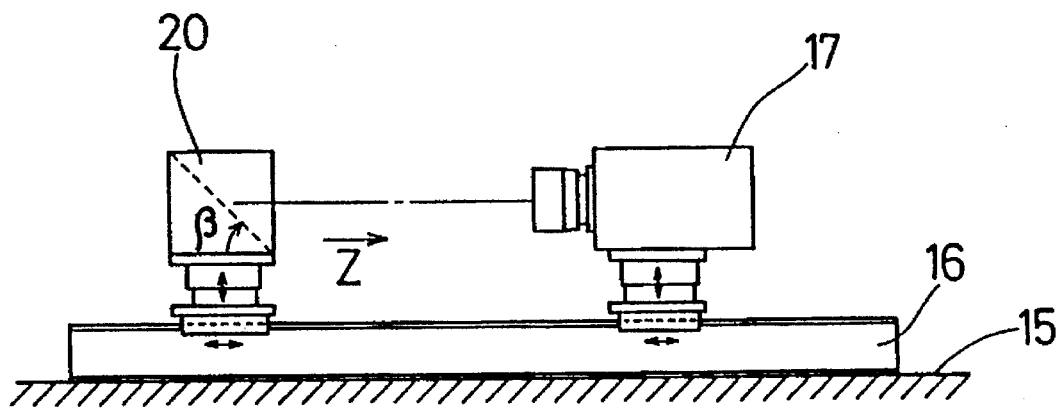
Figure 6:
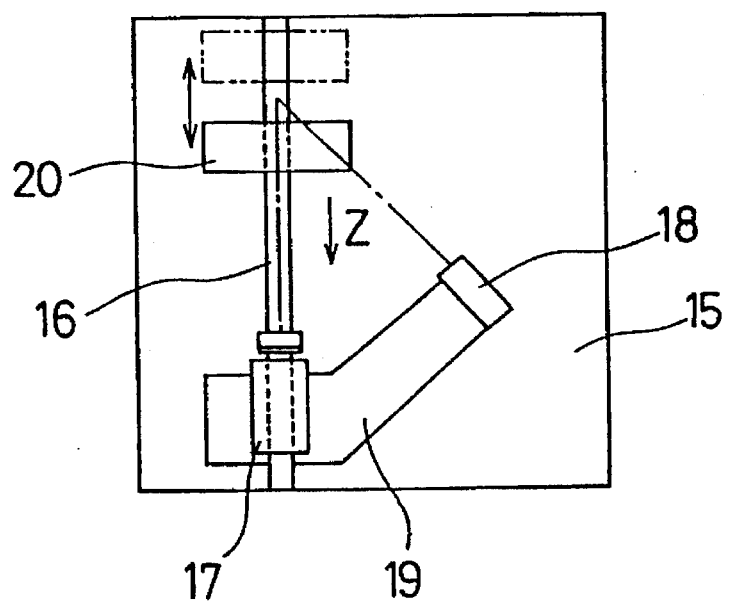

A calibration method will be described below. FIGS. 5 and 6 show the front view and plan view of a calibration system used in this embodiment, respectively.

In the calibration system, as shown in the drawings, a rail 16 used for optical instruments is provided on a base 15 and an optical system 19 comprising a CCD camera 17 and a laser generator 18 is movably placed on the rail 16. A calibration block 20, which serves as a specimen having an given inclination angle, is also movably placed on the rail 16, being a predetermined distance away from the optical system 19. The positions of the optical system 19 and the calibration block 20 are adjustable also in a vertical direction.

In the calibration system as described above, laser light is projected to the calibration block 20 from the laser generator 18 while the calibration block 20 being held at a specified angle β in a specified position and a projected light image formed on the calibration block 20 is photographed by the CCD camera 17. The inclination angle θ' and position x (see FIG. 4) of the projected light image in the image plane are calculated and a correction value δ for the work angle θ is calculated. Then, the calibration block 20 is moved in the direction z (see FIGS. 5 and 6) to take a plurality of positions, and sequential correction values δ corresponding to the respective positions are calculated in the same way. Further, while the angle of the calibration block 20 being successively changed, sequential correction values δ corresponding to the respective angles are calculated. Based on many data pieces thus obtained, a calibration table is prepared.

Figure 7:
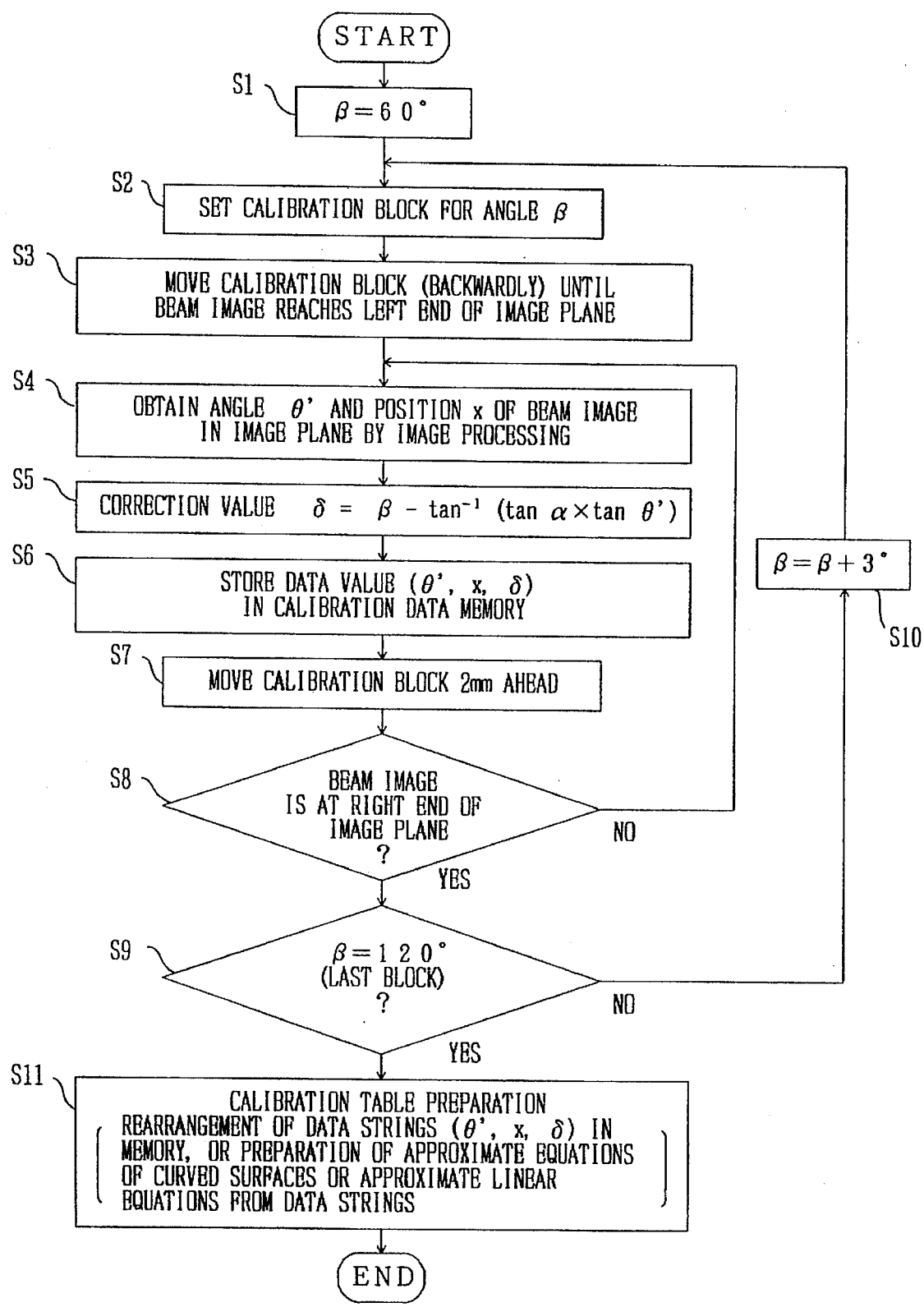

Referring now to the flow chart of FIG. 7, the processes for preparing the calibration table will be described. In the following description, angles to be measured, that is, calibration angles are in the range of β=60° to 120°.

S1 to S6: Firstly, the angle β of the calibration block 20 is set to 60°. The calibration block 20 having an angle β of 60° is placed and then moved (backwards) until the image of the laser light (beam) comes to the left end of the image plane (screen). The inclination angle θ' (which corresponds to the block angle β) and position x of the projected light image in the image plane are calculated by image processing and a correction value δ corresponding to the inclination angle θ' and the position x thus obtained is calculated from equation δ=β−tan$^{-1}$(tan α×tanθ'). The inclination angle θ', the position x and the correction value δ are stored in the memory 12 (see FIG. 2).

S7 to S8: The calibration block 20 is then moved forwards by 2 mm. If the image of the beam does not reach the right end of the image plane by this movement, Steps S4 to S7 are repeated at the calibration block position after the movement. Since the calibration block 20 is moved for measurement within the range of about 40 mm and satisfactory measurement accuracy can be achieved with about 20 pieces of data collected from this range, the moving pitch of the calibration block 20 is set to 2 mm herein.

S9 to S11: In the case where the image of the beam has reached the right end of the image plane by the movement of the calibration block 20, if the block angle $\beta$ of the calibration block 20 does not reach the preset maximum angle (=120°), in other words, if the calibration block 20 is not the last calibration block with the maximum angle, a specified angle (=3°) is added to the block angle $\beta$ and then Steps S2 and onwards are repeated with the next calibration block 20. When the measurement of the last calibration block 20 has been completed, a calibration table is prepared either by rearranging data strings ($\theta'$, x, $\delta$) stored in the memory 12 or by converting the data strings into the form of equations of approximate curved surfaces or approximate lines. It is confirmed from experience that a tolerance of about ±0.1° can be ensured for the measurement, by performing calibration in which the block angle $\beta$ is changed by 3° to 5° within the range of 60° to 120°.

One example of the calibration table thus prepared is shown in FIG. 8. By the use of this calibration table, the correction value $\delta$ for the work angle $\theta$ can be obtained from the inclination angle $\theta'$ and position x of the projected light image formed in the image plane. This correction value $\delta$ is added to the work angle $\theta$ obtained from the aforesaid equation (1), thereby obtaining the final work angle $\theta$. Note that the number of data pieces collected from the direction x corresponds to the pitch of the movement of the calibration block 20 in the direction z in FIG. 5, and that the number of data pieces collected from the direction $\theta'$ corresponds to the number of angular positions $\beta$ which the calibration block 20 takes. When data pieces obtained as the calibration block 20 moves in the direction z and data pieces obtained as the block angle $\beta$ increases are plotted in the graph of FIG. 8, the former is represented by the direction of arrow P and the latter by the direction of arrow Q. Note that the number of data pieces can be determined in accordance with the required accuracy.

Figure 9:
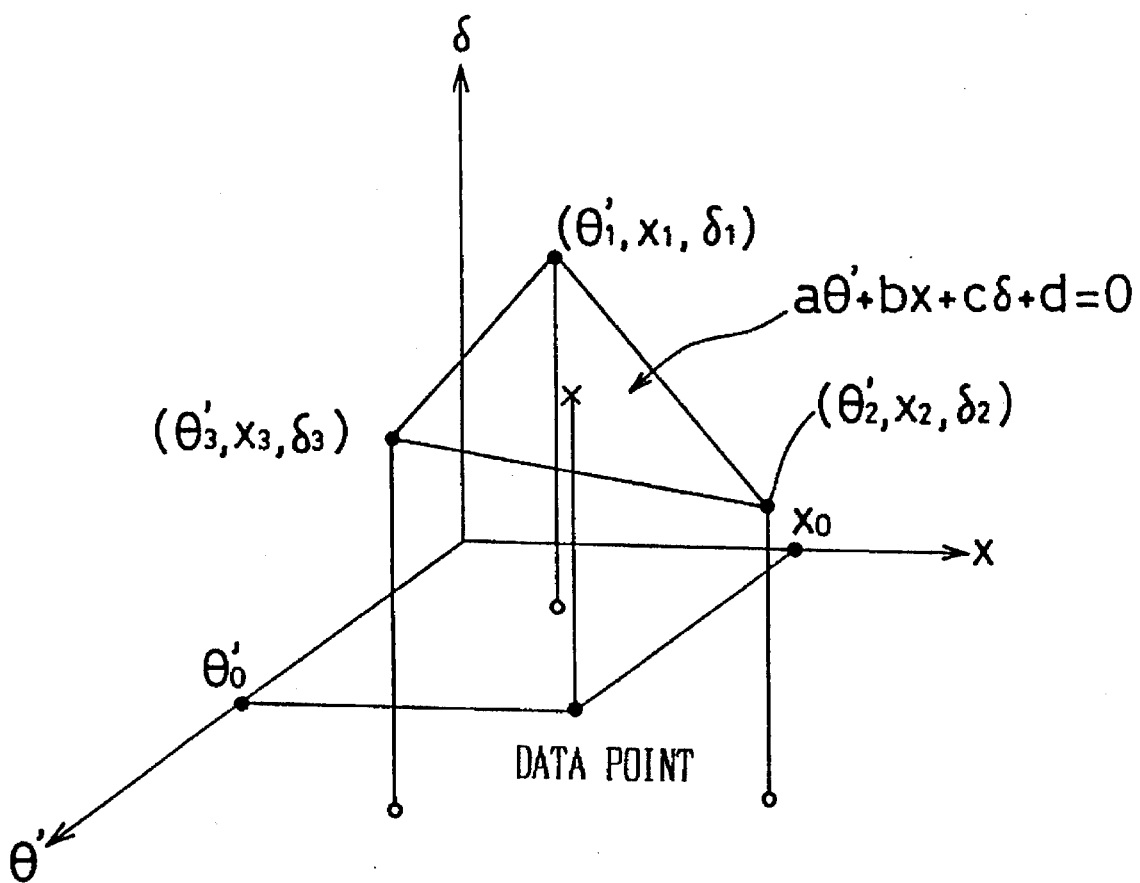

In practice, the correction value $\delta$ is calculated using a mathematical interpolation method, after referring to the data of the calibration table with the inclination angle $\theta'$ and position x of the projected light image which have been obtained by image processing. Now, as one example of the interpolation method, a method in which a divided polynomial is used will be described. According to this method, an arbitrary curved surface representative of three variables ($\theta'$, x, $\delta'$) such as shown in FIG. 8 is approximated as shown in FIG. 9, by a linear equation of three points which are proximate to the curved surface. More specifically, three points (three table data pieces) ($\theta_1'$, $x_1$, $\delta_1$), ($\theta_2'$, $x_2$, $\delta_2$), ($\theta_3'$, $x_3$, $\delta_3$), which enclose a data point ($\theta_0'$, $x_0$) in the $\theta'$-x plane, are firstly extracted and then, a plane $a\theta'+bx+c\delta+d=0$ determined by the three points is obtained. From the plane $a\theta'+bx+c\delta+d=0$, a correction value $\delta_0$ is obtained using the following equation.

$$\delta_0 = -(a\theta_0' + bx_0 + d)/c$$

With such an interpolation method, curved surfaces can be expressed by a number of linear polynomial equations so that interpolation can be easily carried out. This interpolation method is only an example, and it is therefore apparent that other interpolation methods may be employed.

Figure 10:
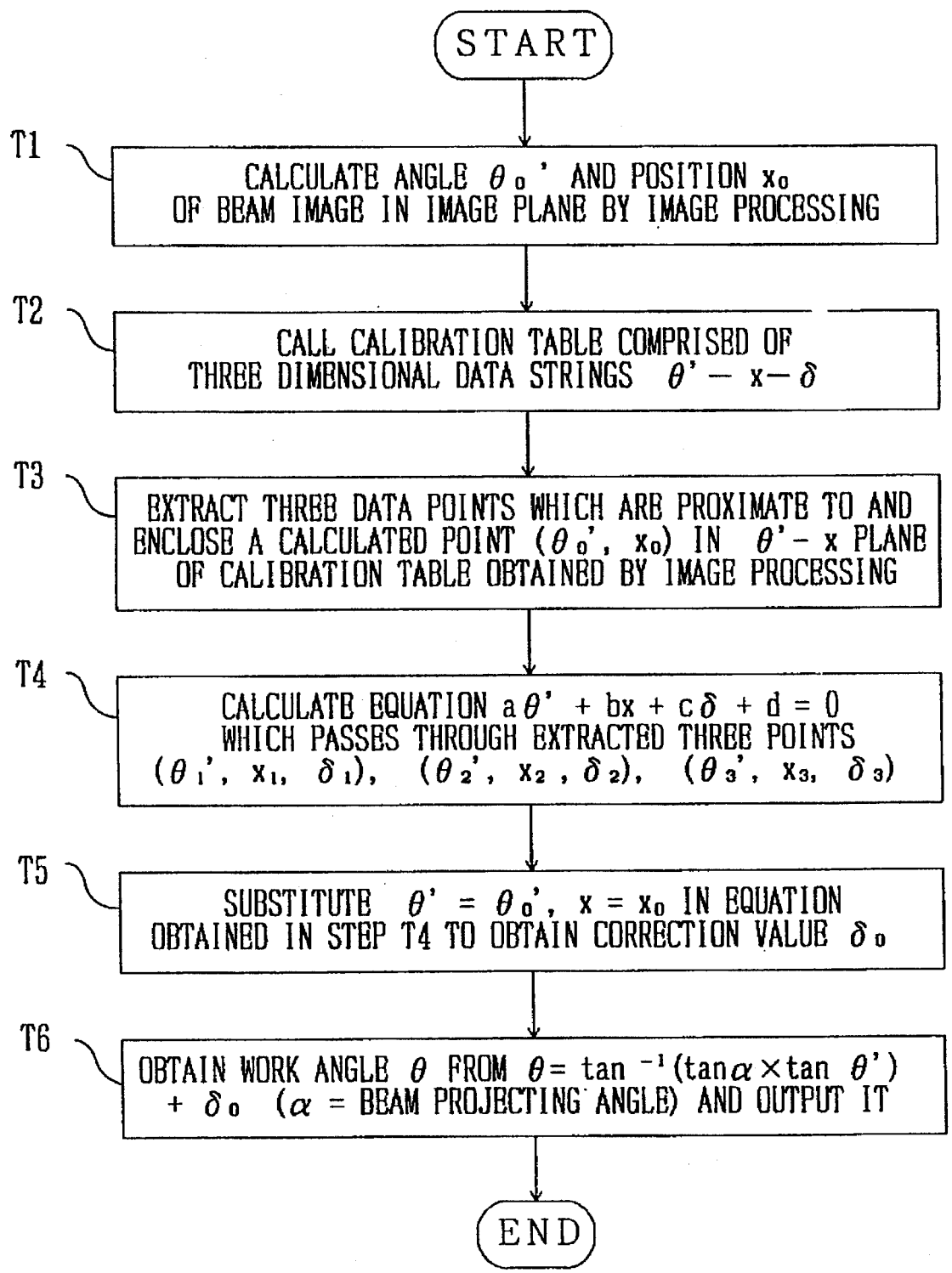

With reference to the flow chart of FIG. 10, the processes of work angle measurement which includes the calculation of the correction value $\delta$ by the above-described interpolation method will be described.

T1 to T3: The inclination angle $\theta_0'$ and position $x_0$ of the projected light image in the image plane are obtained by image processing. Then, the calibration table comprised of three dimensional data strings $\theta'$-x-$\delta$ is called and three points ($\theta_1'$, $X_1$, $\delta_1$), ($\theta_2'$, $X_2$, $\delta_2$), ($\theta_3'$, $X_3$, $\delta_3$), which are proximate to a point ($\theta_0'$, $x_0$) and enclose it in the $\theta'$-x plane of the calibration table, are extracted.

T4 to T6: An equation of a plane $a\theta'+bx+c\delta+d=0$ which passes through the extracted three points ($\theta_1'$, $X_1$, $\delta_1$), ($\theta_2'$, $X_2$, $\delta_2$), ($\theta_3'$, $X_3$, $\delta_3$) is obtained and $\theta'=\theta_0'$, $x=x_0$ are substituted in the equation of the plane $a\theta'+bx+c\delta+d=0$, thereby obtaining the correction value $\delta_0$. Then, the work angle $\theta$ is obtained from equation $\theta=\tan^{-1}(\tan\alpha \times \tan\theta')+\delta_0$ where $\alpha$ is the projecting angle of the beam. The work angle $\theta$ thus obtained is released to the ram control unit 14 (see FIG. 2).

In the foregoing embodiment, the correction value $\delta$ is obtained from the inclination angle $\theta'$ and position x of the linear projected light image in the image plane, using the calibration table and the work angle $\theta$ is calculated based on the correction value $\delta$. Alternatively, the work angle $\theta$ may be obtained such that a data table by the use of which the work angle $\theta$ can be directly calculated from the inclination angle $\theta'$ and the position x is prepared and the work angle $\theta$ is obtained by accessing data in such a data table.

Although the calibration table in the foregoing embodiment is composed of a group of three dimensional coordinates of points as shown in FIG. 8, it may be expressed in other forms such as three dimensional coordinates of lines or curved surfaces. These lines and curved surfaces are obtained from the coordinates of points, using an approximation method (e.g., the least square method). The calibration table composed of three-dimensional coordinates of lines or curved surfaces can advantageously save the time required for calculation, but it imposes such a drawback that measurement accuracy decreases when uncertain factors such as variations in the image receptor and lens distortion have a significant effect on the measurement.

While a slit light is used to form the linear projected light image in the foregoing embodiment, it is also possible that a plurality of aligned spot lights are used instead of the slit light and an approximate line passing through the center of each projected spot light is obtained by arithmetic operation, whereby the angle of the projected light image is obtained.

(2) Main straight line extracting device for extracting a main straight line from a projected light image:

Now there will be explained a preferred embodiment of a main straight line extracting device for use with the above-described bending angle detector. This device extracts a main straight line from a projected light image by image processing, when the above bending angle detector calculates the inclination angle $\theta_0'$ and position $x_0$ of the projected light image in the image plane (see Step T1 in FIG. 10).

Figure 11:
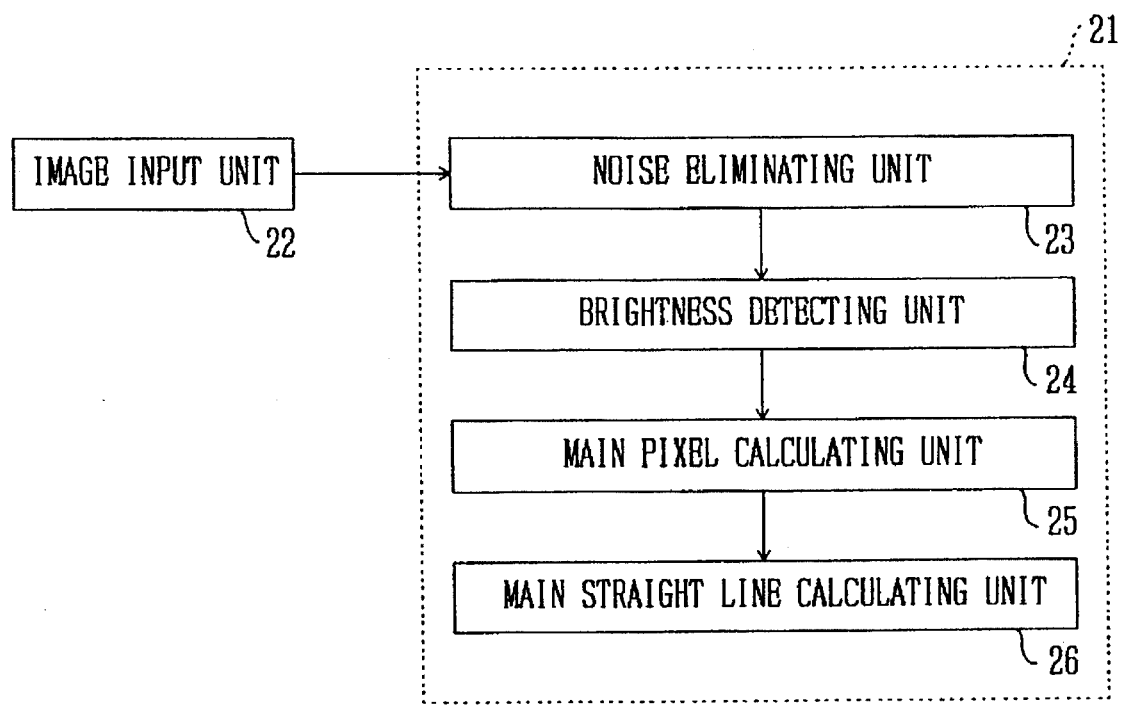
Figure 12A:
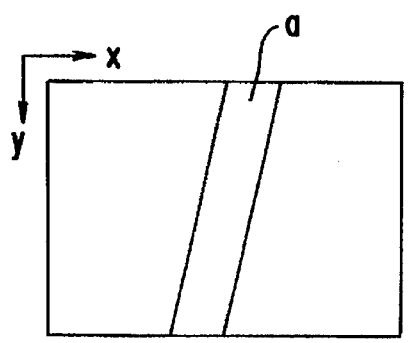
FIGS. 12(a)–12(f) are diagrams illustrating processing steps.
Figure 12D:
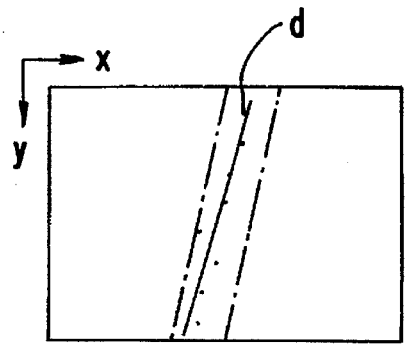
Figure 12B:
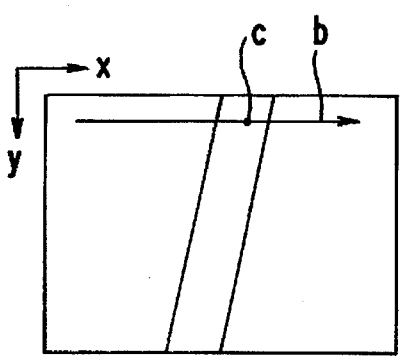
Figure 12E:
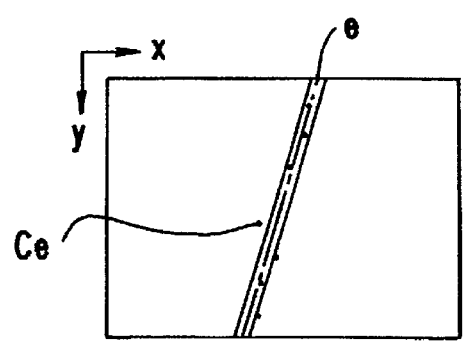
Figure 12C:
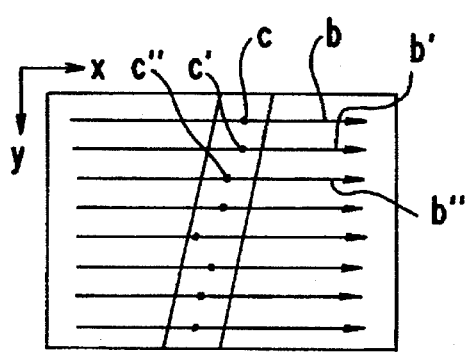
Figure 12F:
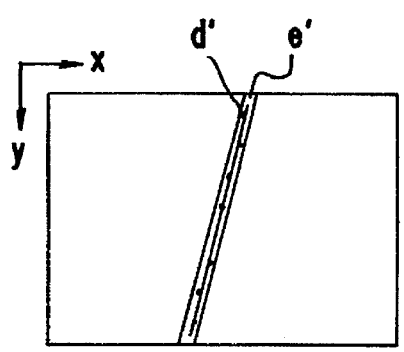

In this embodiment, the linear projected light image in the form of a gray-scale image is taken in a main straight line extracting device 21 through an image input unit 22, as shown in FIG. 11. The gray-scale image thus taken in has 420 (in a vertical direction)×510 (in a lateral direction) pixels and 256 (0 to 255) gradations of brightness for each pixel.

The main straight line extracting device 21 comprises (i) a noise eliminating unit 23 for eliminating noise from the gray-scale image which has been supplied to the device 21 through the image input unit 22; (ii) a brightness detecting unit 24 for detecting the brightness of each pixel in the gray-scale image from which noise has been eliminated by the noise eliminating unit 23; (iii) a main pixel calculating unit 25 for obtaining, by arithmetic operation, main pixels associated with the optical axis of a bright zone from the distribution of the brightness of pixels detected by the brightness detecting unit 24; and (iv) a main straight line calculating unit 26 for obtaining, by arithmetic operation, a main straight line from a plurality of main pixels obtained by the main pixel calculating unit 25, using a mathematical approximation method such as the least square method.

According to the main straight line extracting device 21 having such components, after the gray-scale image having a linear bright zone a as shown in FIG. 12($a$) has been supplied to the device 21 through the image input unit 22, noise is eliminated from the gray-scale image by the noise eliminating unit 23. Thereafter, the brightness detecting unit 24 detects the brightness of each of pixels aligned in one pixel line b which extends in a direction parallel to the x axis of the coordinate system (x-y) representative of the gray-scale image as shown in FIG. 12($b$). From the distribution of the brightness values obtained in this way, the main pixel calculating unit 25 obtains, by arithmetic operation, a main pixel c associated with the optical axis of the bright zone a. Such arithmetic operation for obtaining a main pixel is repeated on other pixel lines b', b" . . . which are parallel to the pixel line b (they are not necessarily parallel to the pixel line b) as shown in FIG. 12($c$), so that main pixels c', c" . . . can be extracted as a sequence of points in the image plane and one pixel is regarded as one unit in this sequence. From the sequence of pixels c', c" . . . thus extracted, a main straight line (approximate line) d as shown in FIG. 12($d$) is obtained by using a mathematical approximation method such as the least square method.

In order to increase the extraction accuracy of the main straight line, a specified width (e.g., one pixel) is allowed to the approximate line d obtained in the above method, thereby determining a main straight line region e as shown in FIG. 12($e$), and the remotest point (pixel) $c_e$ from the main straight line region e is deleted. Thereafter, an approximate line d' is again obtained based on the remaining pixels as shown in FIG. 12($f$) and a main straight line region e' is set in the same manner as described above. This process is repeatedly performed until all the main pixels are included in a main straight line region (i.e., until all the main pixels converge), thereby determining a final main straight line.

Figure 13:
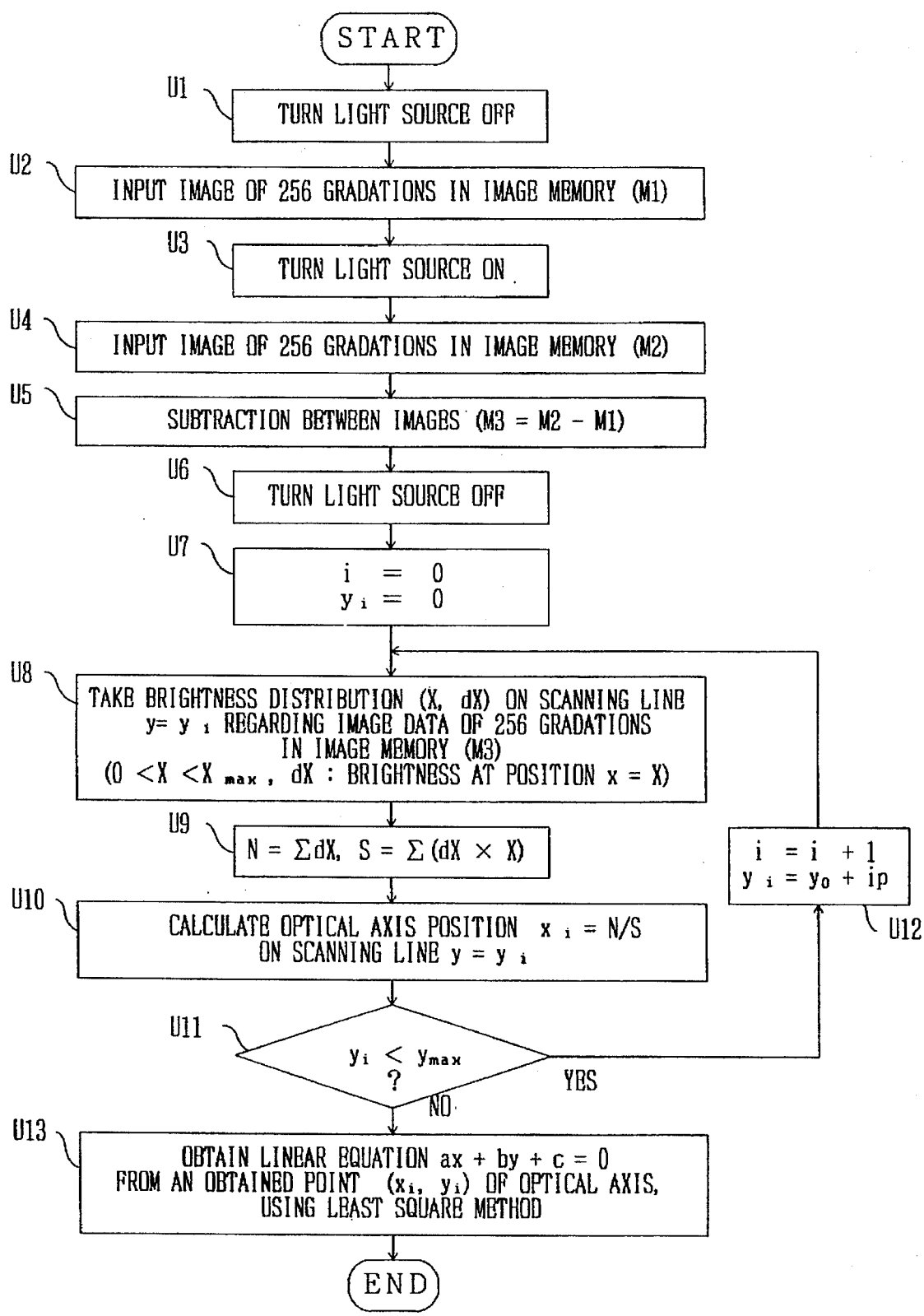

Reference is made to the flow chart of FIG. 13 for more particularly describing the processes of the main straight line extraction shown in FIGS. 12($a$) to 12($d$).

U1 to U6: The light source for projecting a linear projected light image onto the workpiece is turned OFF and an image having 256 gradations of brightness is input in an image memory (M1). Then, the light source is turned ON and an image having 256 gradations of brightness is input in another image memory (M2). Subtraction between the two images input in the memories M1, M2 (M3=M2–M1) is executed and the light source is turned OFF again. Through the above process, an image to be processed is taken in the main straight line extracting device and noise (the brightness of unnecessary parts) generated in the image plane is eliminated through the subtraction process performed on the images created before and after projection of a beam from the light source.

U7 to U10: A number i which represents the number of points associated with the optical axis of the bright zone is set to 0 and the initial value $Y_0$ of the scanning line $Y_i$ (=pixel line) is set to 0. Thereafter, the distribution (X, dX) of brightness on a scan line $y=y_i$ is taken out of the image data having 256 graduations of brightness and stored in the image memory (M3). In this embodiment, dX represents a brightness (in the range of 0 to 255) at the position x=X, and X satisfies $0<X<X_{max}$ ($X_{max}$ represents the number of pixels aligned in a direction parallel to the x-axis of the image plane).

Figure 14:
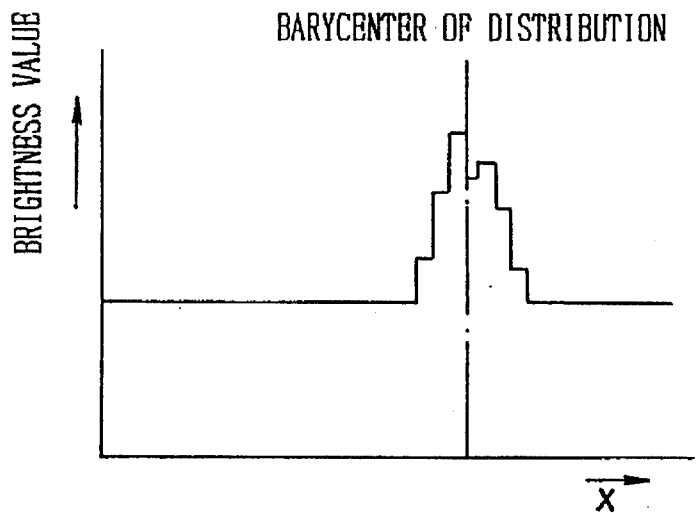

In order to obtain the barycenter in the brightness distribution, the sum ($N=\Sigma dX$) of the brightness dX is obtained and the sum ($S=\Sigma(dX \times X)$) of the product of the coordinates X and the brightness dX corresponding to the coordinates X is obtained. From the sums N and S thus obtained, the position of the optical axis $x_i$ on the scanning line $y=y_i$ is calculated using the equation $x_i=N/S$. FIG. 14 shows the concept of the process for obtaining the position of the optical axis from the barycenter (represented by chain line) of the brightness distribution. This method using barycenter in brightness distribution is useful particularly when the brightness distribution obtained from such a surface is not a normal distribution because the workpiece does not have uniform color at its surface.

U11 to U13: If $y_i$ does not reach $Y_{max}$ ($y_i$=the number of pixels aligned in a direction parallel to the y-axis of the image plane), the number i is incremented by one and the scanning line $y_i$ is moved in a direction parallel to the y-axis by a scan spacing (pitch) p (i.e., $y_i=y_0+ip$). Then, Steps U8 and onwards are repeated. If $y_i$ has reached $Y_{max}$, a main straight line (approximate line) ax+by+c=0 is obtained from a plurality of points associated with the optical axis ($x_i$, $y_i$), using the least square method.

In the foregoing embodiment, noise elimination is carried out by subtracting operation performed on images before and after beam projection, but noise could be eliminated in the following ways. (1) A specified threshold is set for brightness and brightness values below this threshold are set to zero, whereby noise elimination can be performed. (2) The brightness values of isolated pixels are set to zero, thereby eliminating noise. The pixels adjacent to the isolated pixel have a brightness of 0.

Figure 15:
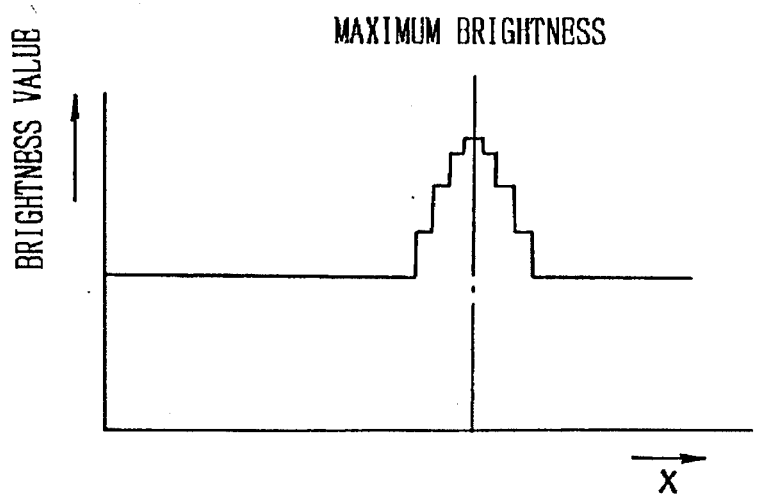
Figure 16:
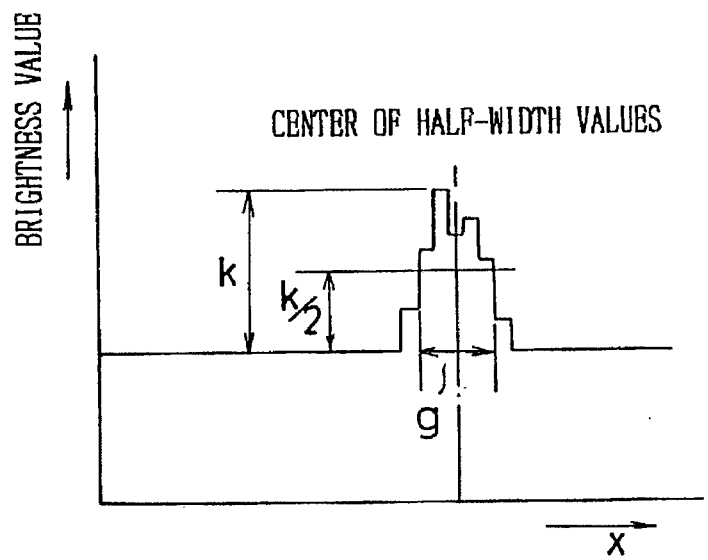

Although a main pixel is obtained from the barycenter in the brightness distribution of pixels aligned on a specified scanning axis, there are other methods for obtaining a main pixel. (1) A pixel having the highest brightness is determined as the main pixel (see FIG. 15). (2) The half-width g of the brightness of each of pixels aligned on a specified scanning axis is obtained from their brightness distribution and the central value of the half-width g is determined as the main pixel (see FIG. 16). The method (1) is effective when the brightness distribution is a normal distribution when a workpiece has uniform color at its surface, while the method (2) is effective when the brightness distribution is not a normal distribution like the method using the barycenter in the brightness distribution.

Figure 17:
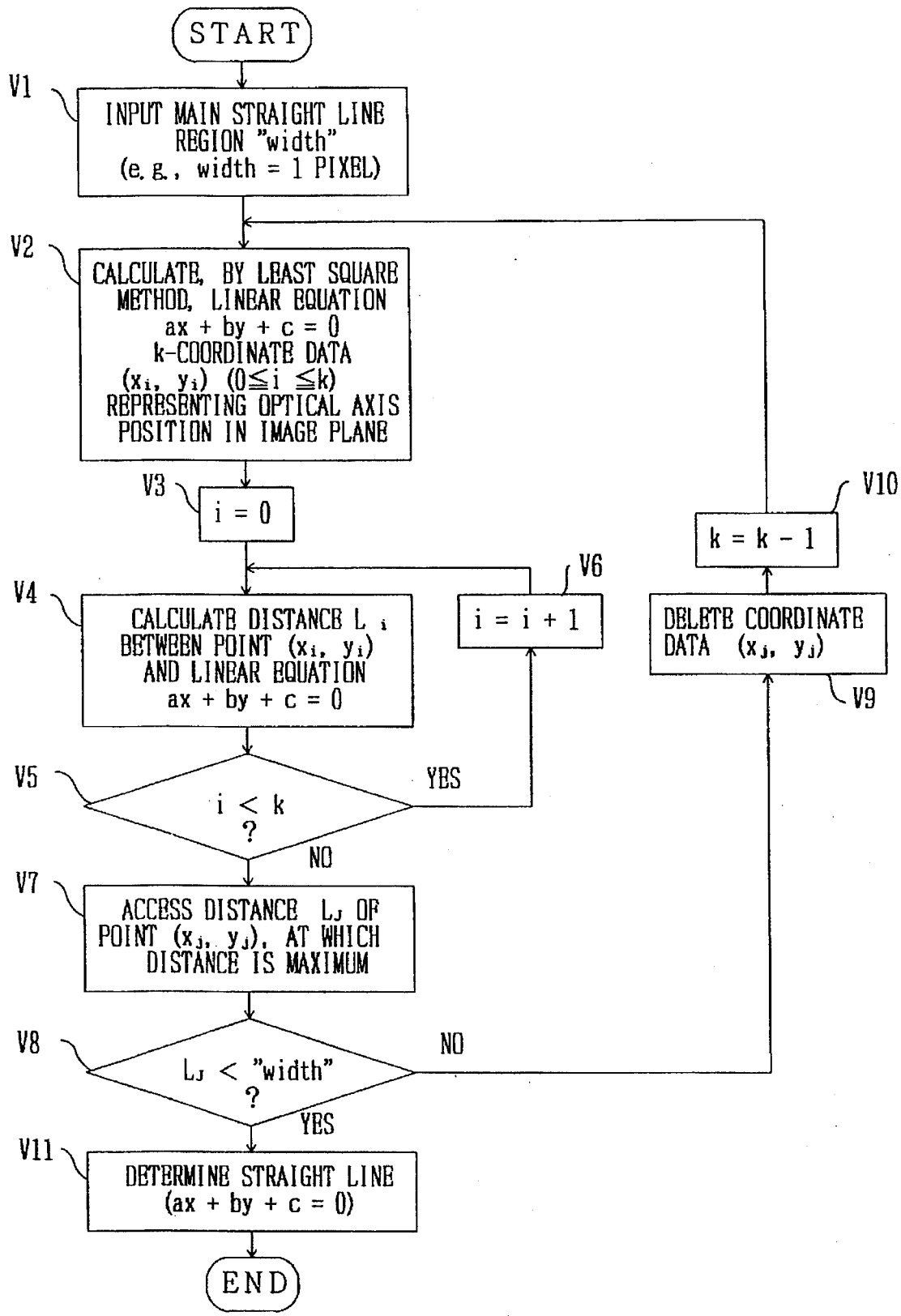

With reference to the flow chart of FIG. 17, there will be explained a control flow of the main straight line extraction designed to increase accuracy and shown in FIGS. 12($e$) and 12($f$).

V1 to V2: The main straight line region "width" (e.g., width=1 pixel) is input. Then, the main straight line (approximate line) ax+by+c=0 is obtained from k-points ($x_i$, $y_i$) ($0 \leq i \leq k$) which designate the position of the optical axis in the image plane, using the least square method.

V3 to V6: The number i which represents the number of points associated with the optical axis is set to zero. Then, the distance $L_i$ between the point ($x_i$, $y_i$) and the straight line ax+by+c=0 is calculated. If the number i does not reach k, the number i is incremented by one and the distance $L_i$ is successively calculated.

V7 to V11: If the number I has reached k, a point $(x_j, y_j)$ associated with the optical axis, which is the remotest point from the approximate line, is found and the distance $L_j$ between the remotest point $(x_j, y_j)$ and the approximate line is obtained. If the distance $L_j$ does not fall within the main straight line region "width", data on the point $(x_j, y_j)$ is deleted and k is decremented by one, for the purpose of removing the point which is out of the main straight line region "width". Then, the program returns to Step V2. Steps V2 onward are repeated and when all the points $(x_j, y_j)$ are included in the main straight line region "width", the main straight line (ax+by+c=0) is determined.

Figure 18:
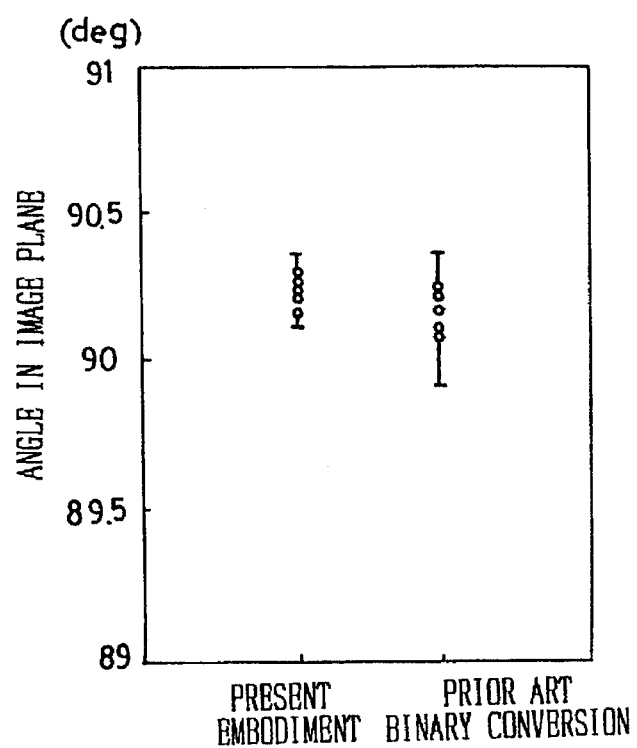

When comparison was made between the main straight line extracted by the main straight line extracting device 21 of this embodiment and a main straight line extracted by binary conversion in terms of angle in the image plane, the result was as shown in FIG. 18. It is understood from FIG. 18 that the variation in the bending angle detected in the embodiment is smaller than that detected in the binary conversion process and therefore the device according to the embodiment can improve detection accuracy over the prior art.

(3) Straight line extracting device for extracting only a necessary straight line in an image plane There will be given an explanation on another preferred embodiment of the straight line extracting device of the invention, in which if a workpiece bent at a plurality of positions is processed, only a necessary straight line in the image plane can be extracted when the bending angle detector detects the inclination angle $\theta_0'$ and position $x_0$ of a projected light image in the image plane (see Step T1 in FIG. 10).

Figure 19:
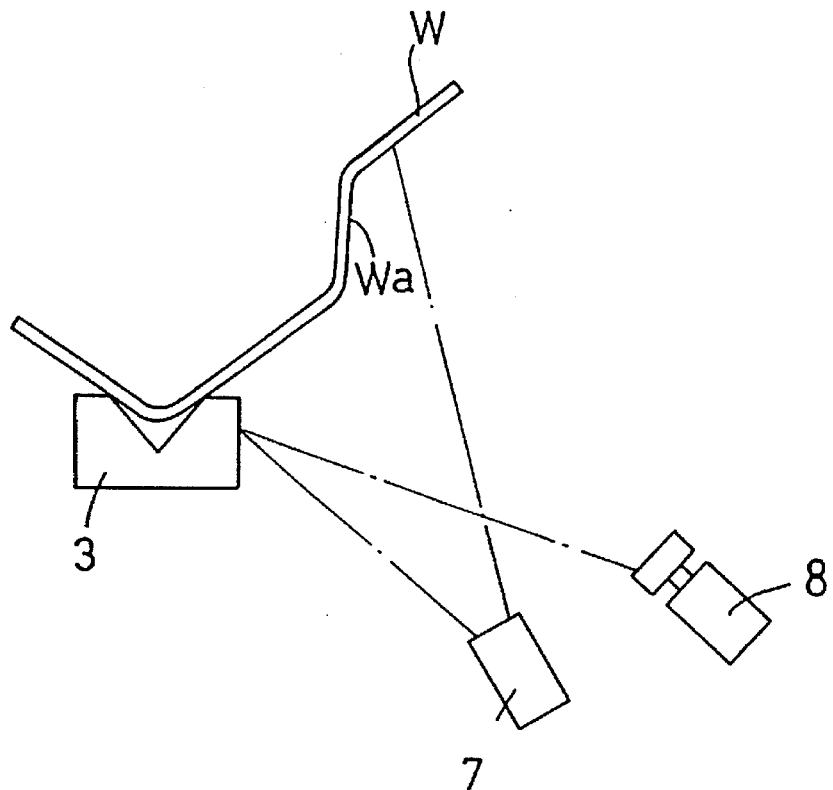
Figure 20:
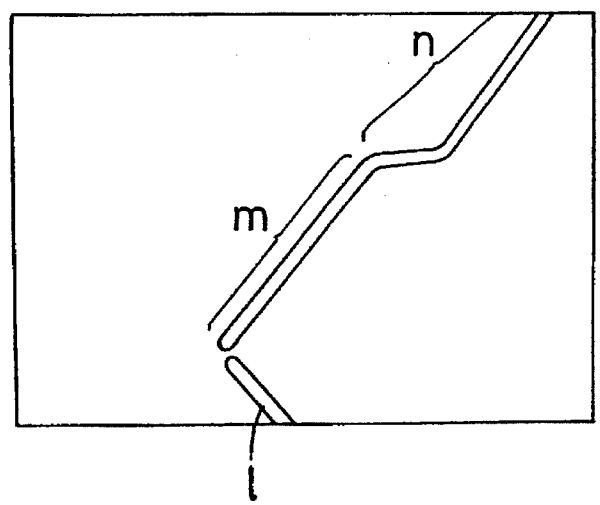

As shown in FIG. 19, in the bending angle detector according to this embodiment, the light source 7 is disposed such that a slit light from the light source 7 is projected onto the outer face Wa of the workpiece W and a part of the lower bender 3 and the CCD camera 8 is so disposed as to take the image of the lower bender 3 in the corner of the field of view FIG. 20 shows a photographed image of the workpiece W and the lower bender 3 of FIG. 19. In FIG. 20, l represents the image of the lower bender 3 and n represents the image of a bent portion at the forward end of the workpiece W. The image portions l and n are not necessary for the bending angle detection of the workpiece W. This embodiment provides a method for extracting only a straight line (=the portion m in the case of FIG. 20) necessary for bending angle detection from an image taken in the straight line extracting device.

Figure 21A:
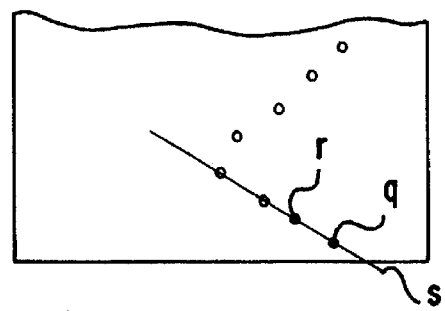
FIGS. 21(a)–21(c) illustrate processing steps.

In the straight line extracting device according to the embodiment, a necessary straight line is extracted in the following way. An image photographed by the CCD camera 8 is converted into binary form with an appropriated threshold, using a known image processing technique and thinned to form a line having a width equal to one pixel. The thinned line having a width equal to one pixel is represented as an aggregate (sequence) of points (x, y) whose unit is one pixel. In the image composed of a sequence of points, a line s is drawn between a point q located at the bottom end of the image and a point r that is adjacent to the point q as shown in FIG. 21(a). A preset width t (e.g., t= one pixel) is allowed to the line s (see FIG. 21(b)) and it is determined whether a point u next to the point r is within the width t. If so, a line v including the point u is drawn and specified as one line segment. Otherwise, the line extending to the point r is specified as one line segment. Such a process is repeated, thereby extracting a graphic pattern consisting of several straight lines (see FIG. 21(c)) and a line w linked to the line v which crosses the bottom end of the image is taken out of the pattern, whereby a target straight line can be extracted. In the above process of determining a line segment, if a line segment consisting of only two points is obtained, this line segment is preferably deleted as an unnecessary segment.

Figure 21B:
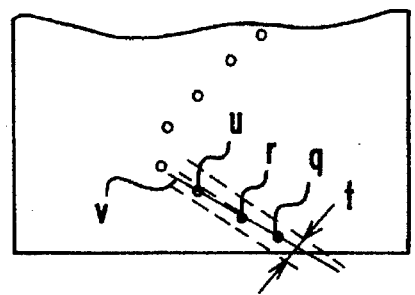
Figure 21C:
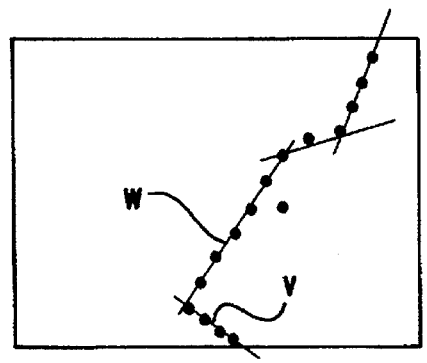

Referring to the flow chart of FIG. 22, the straight line extracting processes depicted in FIGS. 21(a) to 21(c) will be described.

W1 to W3: Image processing is performed on the image of a beam which has been taken in the straight line extracting device. This image is expressed as an aggregate of points whose unit is one pixel. More specifically, the image is expressed by n sets of coordinates $(x_i, y_i)$ ($0 \leq i \leq n$), each set representing a point. In order to start with the lowest point in the image, i is set to n−1 and then the linear equation ax+by+c=0, which passes through the starting point $(x_i, y_i)$ and a point $(x_{i-}, y_{i-1})$ next to the starting point, is calculated using the least square method.

W4 to W8: Number k is set to 2, and the distance $1_k$ between a point $(x_{i-k}, y_{i-k})$ and the linear equation ax+by+c=0 is calculated. The point $(x_{i-k}, y_{i-k})$ is next to the point $(x_{i-1}, y_{i-1})$ and further from the bottom end of the image than the point $(x_{i-1}, y_{1-1})$. If the calculated distance $1_k$ falls within a preset width W (W=2 pixels is preferable), the linear equation ax+by+c=0 regarding (k+1) points (i.e., all the points from the point $(x_i, y_i)$ to the point $(x_{i-k}, _{i-k})$) is calculated using the least square method. Then, the number k is incremented by 1 and the program returns to Step W5.

W9 to W10: If the distance $1_k$ from the point $(x_{i-k}, y_{i-k})$ to the linear equation ax+by+c=0 exceeds the width W, it is determined that k-points (i.e., all the points from the point $(x_i, y_i)$ to the point $(x_{i-k+1}, y_{i-k+1})$) are included in the straight line ax+by+c=0, and a line L given by the point $(x_i, y_i)$ through the point $(x_{i-k+1}, y_{i-k+1})$ is calculated from the following equation.

$$L=((x_{i-k+1}-x_i)^2+(y_{i-k+1}-y_i)^2)^{1/2}$$

W11 to W15: If the length L thus obtained does not exceeds a specified value H, either of the following processes will be executed. The specified value H is set for the determination on the length of a straight line and is preferably equal to half of the length of the image (=more than 250 pixels).

(i) When i−k+1>0 (i.e., if there exist more points to be extracted), i is set to 1−k (i=i−k) in order to start with the next point and then the program returns to Step W3.

(ii) When i−k+1≦0 (i.e., if there is no point to be extracted), it is determined that an error has occurred and then the flow is terminated.

On the other hand, if the length L exceeds the specified value H, it is determined that the obtained linear equation ax+by+c =0 is a point to be extracted on the workpiece, and based on this line, the inclination angle $\theta'$ and position x are calculated, using the following equations respectively. Thereafter, the flow is terminated.

$$\theta'=\tan^{-1}(a/b)$$

$$x=-(b \times y/2+c)/a$$

where Y is the number of pixels aligned in a direction parallel to the y-axis of the image.

In the straight line extracting device according to the foregoing embodiment, when a thinned line having a width equal to one pixel is expressed as an aggregate of points, points may be deleted at specified intervals depending on accuracy required so that the time required for calculation can be saved.

(4) Bending angle detecting position setting device

There will be explained a preferred embodiment of a bending angle detecting position setting device for setting a bending angle detecting position when a bending angle of the workpiece W is detected by the use of the above-described bending angle detector.

Figure 23:
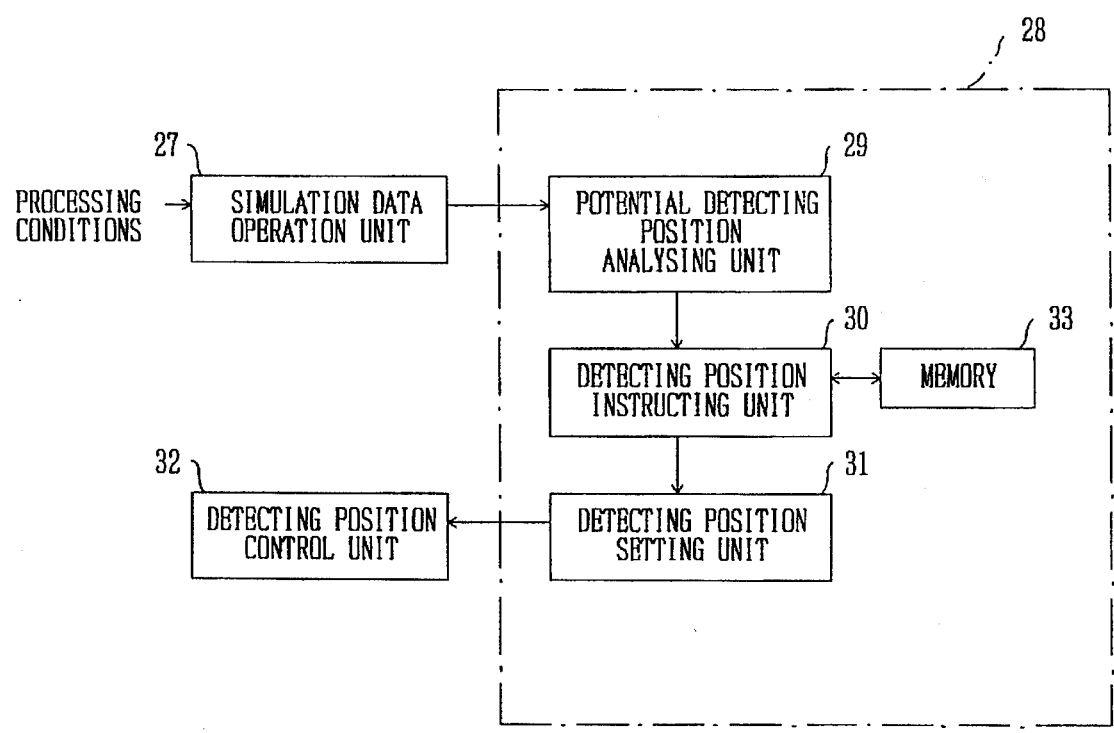

FIG. 23 shows the system arrangement of this embodiment in which a simulation data operation unit 27 is provided for performing arithmetic operation to obtain simulation data from machine conditions and processing conditions such as the shapes of a workpiece and dies. The simulation data is associated with the bending state of the workpiece W in each bending step (simulation data for each bending step is shown in FIG. 24, taking a sash for example). The data from the simulation data operation unit 27 is supplied to a bending angle detecting position setting device 28. The machine conditions mentioned herein are defined as the specification of a bending machine (the shapes of a table and ram) and the specification of a bending angle detector (the number of units, the number of traveling axes, traveling distance, the region of effective detection). The workpiece shape includes bending angle, bending length, the lengths of legs, material, and the shapes of notches, concavities and convexities when the workpiece is blank. The shapes of dies includes V-width, die shape, punch shape, the shape of a die holder etc.

In the bending angle detecting position setting device 28, a potential detecting position analyzing unit 29 analyzes a position where the bending angle detection of the workpiece W might be performed (this position is hereinafter referred to as "potential detecting position"), upon receipt of the data from the simulation data operation unit 27. The analyses are separately carried out based on the profile of the workpiece W and based on pretreatment marks (piercing, embossing etc.). A detecting position instructing unit 30 releases, according to the results of the analyses, concrete information on a detecting position such as the position of the bending angle detector in a longitudinal direction and in a vertical direction. In order to realize the detection based on the instruction from the detecting position instructing unit 30, a detecting position setting unit 31 performs arithmetic operation to obtain data for controlling the bending angle detector. According to the control data obtained by the detecting position setting unit 31, a detecting position control unit 32 controls the bending position detector. Detection patterns for the bending angle detector instructed by the detecting position instructing unit 30 are stored and updated in a memory 33, so that the time required for instruction can be saved when the same workpiece is repeatedly processed or a similar workpiece is processed. The detecting position setting unit 31 can set a position for a bending angle detector in cases where a plurality of bending angle detectors are used or where progressive forming is carried out. The detecting position control unit 32 controls the unitized bending angle detector comprising a light source and CCD camera such that the detector moves in a longitudinal direction of the bending machine and such that the light projecting angle of the light source and the light receiving angle of the CCD camera are altered.

The potential detecting position analyses performed by the potential detecting position analyzing unit 29 are as follows.

Figure 25A:
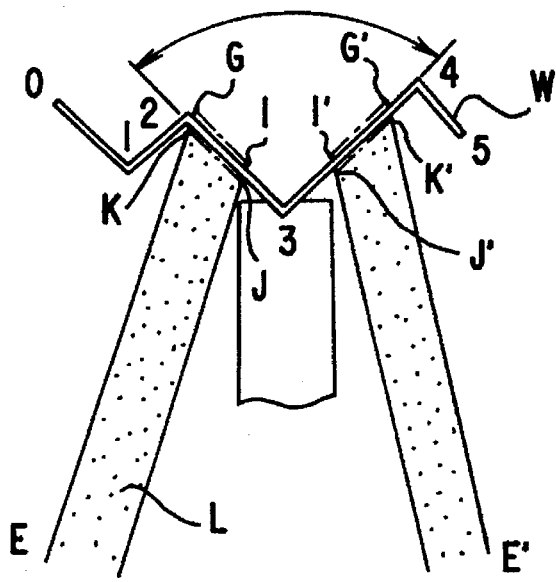
FIGS. 25(a)–25(b) illustrate processes for analyzing a potential detecting position, based on the profile of the workpiece.
Figure 25B:
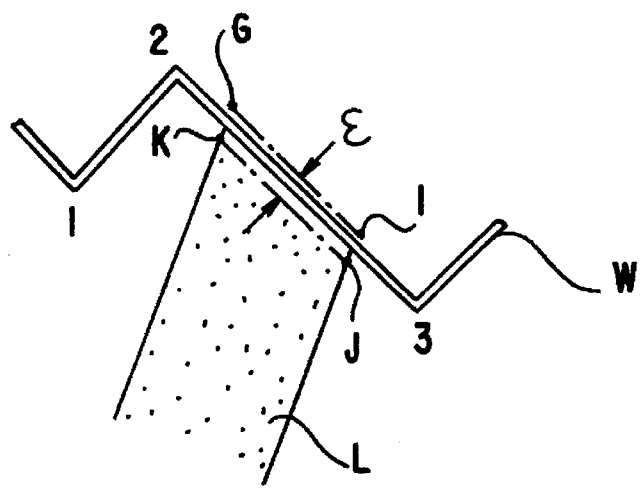

(A) Potential detecting position analysis based on the profile of the workpiece W (see FIG. 25):

In order to detect the bending angle of the workpiece W correctly, it is necessary to determine whether the slit light L from the light source is projected onto the same plane as that of the workpiece W by a specified width. This determination is carried out in the following procedure. FIGS. 25(a) and 25(b) show the determination procedure and FIG. 25(b) is a partially enlarged view of FIG. 25(a).

(1) Line segments GI, JK, G'I', J'K' which are offset by a minute distance $\epsilon$ from the workpiece W and line segments EK and E'K' which are outer lines of the slit light L are defined. Then, it is checked whether any of these line segments GI, JK, G'I', J'K', EK, E'K' intersects any of the sides 0-1, 1-2, 2-3, 3-4, 4-5 of the workpiece W.

(2) It is checked if the end point 0 or 5 of the workpiece W lies within the area enclosed by the points G, I, J, K or G', I', J', K'.

If there is no intersection of the workpiece W and the line segments and the ends of the workpiece W do not lie within either area, it is determined that bending angle detection is possible.

Figure 26A:
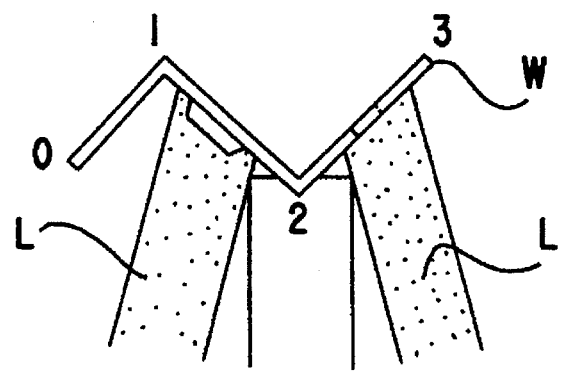
FIGS. 26(a)–26(b) illustrate processes for analyzing a potential detecting position, based on the pretreatment marks of the workpiece.
Figure 26B:
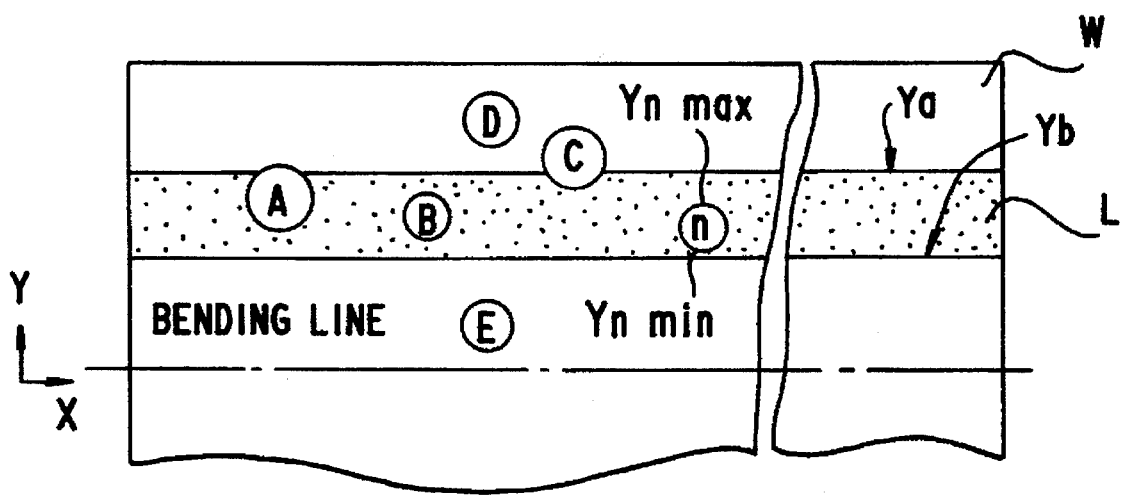

(B) Potential detecting position analysis based on marks created on the workpiece W by pretreatment (see FIG. 26):

If there is a hole, notch, convexity, concavity or the like on the spot where the slit light L is projected onto the workpiece W, bending angle detection cannot be performed smoothly, therefore it is necessary to determine whether such marks exist. The determination on the existence of marks is carried out in the following procedure. FIGS. 26(a) and 26(b) illustrate the processes of the determination and FIG. 26(b) shows the workpiece W in an unfolded condition.

(1) The workpiece W is unfolded. Then, the region where the slit light L impinges is obtained from the workpiece in an unfolded condition, taking into account stretched portions of the bent corner and the projecting position of the slit light L.

(2) Pretreatment marks are divided into individual units such as hole A, hole B, hole C and so on.

(3) For each pretreatment mark, a maximum value $Y_{nmax}$ and minimum value $Y_{nmin}$ in the Y-axis are obtained. Then, the positional relationship between the maximum value $Y_{nmax}$, the minimum value $Y_{nmin}$ and lines Ya, Yb which define the region on which the slit light L is projected is checked, thereby determining whether the mark affects the bending angle detection.

(i) If $Y_{nmax}$, $Y_{nmin}$>Ya or $Y_{nmax}$, $Y_{nmin}$<Yb, it is determined that the mark does not affect the detection. On the other hand, if these conditions are not satisfied, it is judged that the mark affects the detection.

(ii) A region where detection cannot be carried out is determined, based on the shape (circle, square etc.) and position of each unit which affects the detection and the positional relationship between each unit and the lines Ya, Yb.

Figure 27:
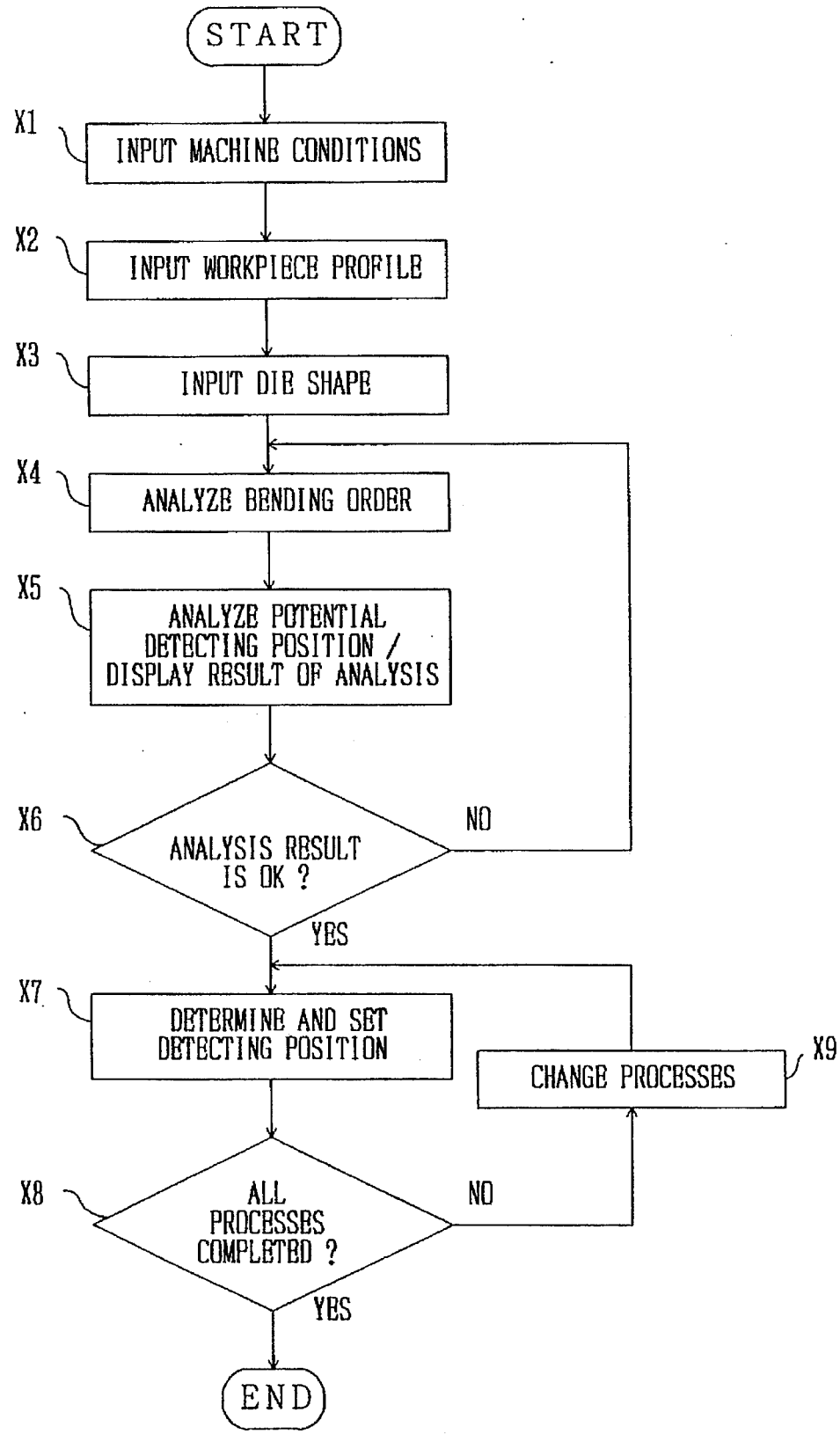
Figure 28:
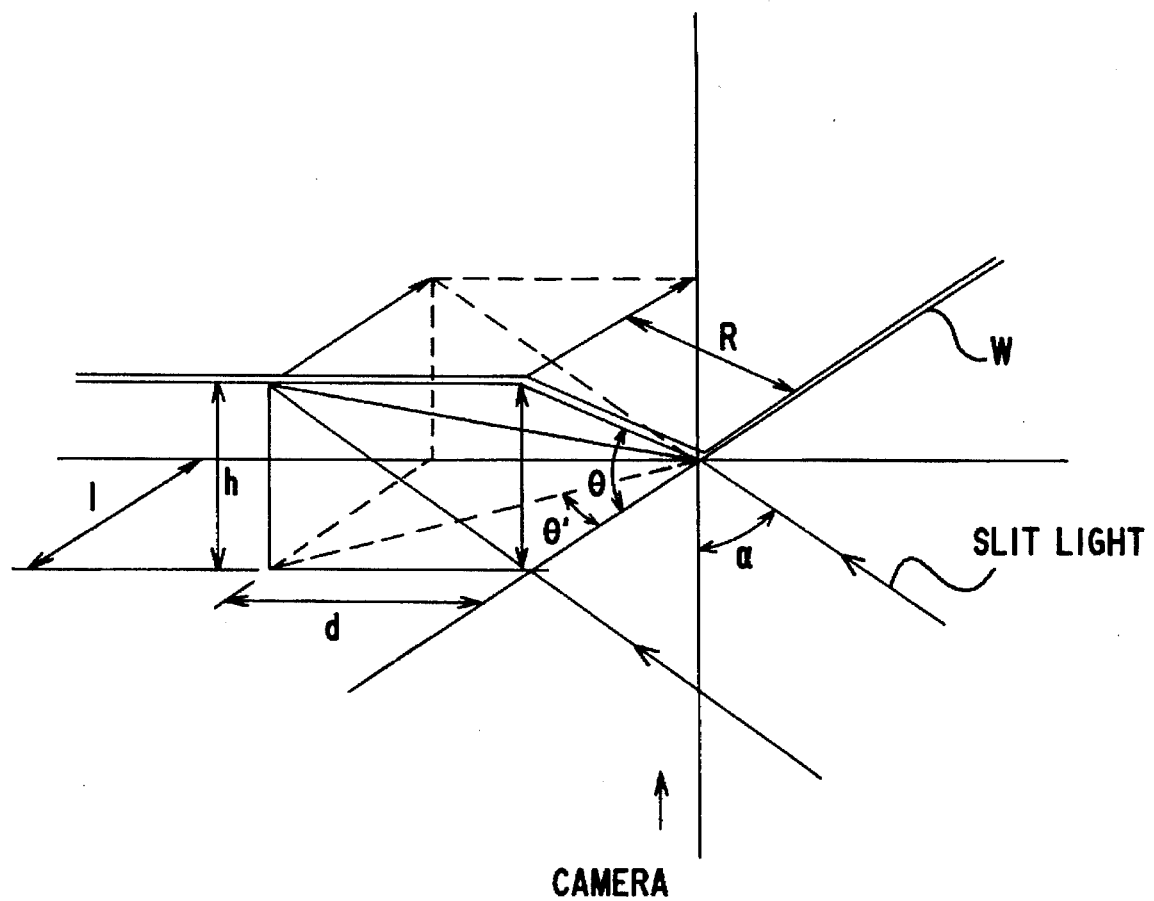
FIGS. 28 to 30 illustrate a prior art bending angle detector.
Figure 29:
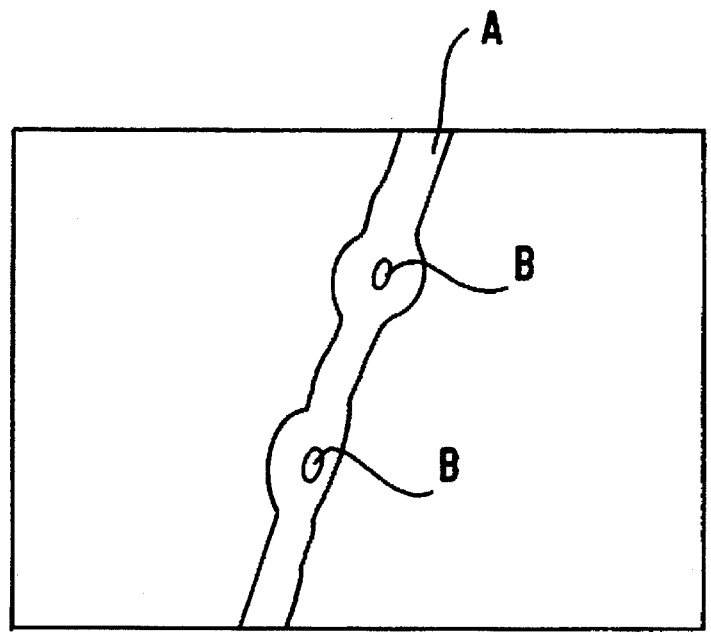
Figure 30:
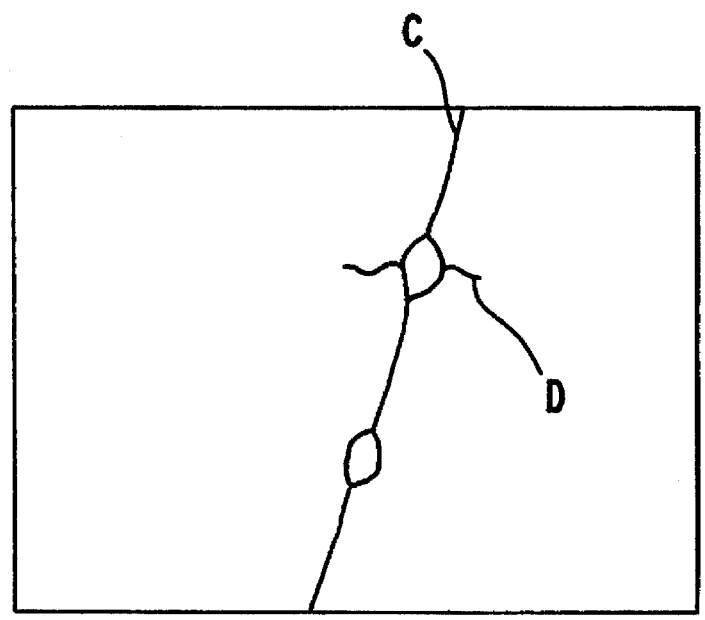

Reference is made to the flow chart of FIG. 27, for describing the processes of setting a detecting position for the bending angle detector by means of the bending angle detecting position setting device 28 according to the embodiment.

X1 to X3: Machine conditions, the shapes of the workpiece W and dies are input.

X4 to X5: A bending order for the workpiece W is analyzed, thereby obtaining simulation data associated with the bending state of the workpiece W in each bending step. Upon receipt of the simulation data, the potential detecting position analyzing unit 29 performs the potential detecting position analyses based on the profile of the workpiece W and based on pretreatment marks. The results of the analyses are displayed. Note that a plurality of results are output in the bending order analysis.

X6 to X9: determination as to whether the results of the analyses are good or not is performed and if they are not good, the program returns to Step X4 to do analyses again. On the other hand, if the results are all good, the detecting position instructing unit 30 instructs, according to the result of the analyses, concrete information on a detecting position for the bending angle detector in terms of a longitudinal direction and vertical direction. In accordance with the instruction, control data for the bending angle detector is created. In this case, preliminarily registered detection patterns (e.g., a pattern indicating an eccentric position from the center of the workpiece W) are utilized and new detection patterns (updated data) are registered.

If setting processes in all the steps are not completed, the process is changed and the instructing/setting process in Step X7 is again executed. If completed, the flow is terminated.

In Step X4 of the flow chart of FIG. 27, the bending order analysis is preferably performed taking into consideration not only the potential detecting position analyses but also how to facilitate image processing in the bending angle detector.

In the forgoing embodiment of the bending angle detecting position setting device 28, the bending angle detector is preferably retracted after bending angle detection so as not to disturb the processing.

It is preferable that when the bending angle detector is moved to a specified position, the detected data calibration is automatically performed as the detector moves, by the use of, for example, the calibration table.

In the bending angle detecting position setting device 28 of the foregoing embodiment, a potential position for bending angle detection is first obtained and based on this potential position, a detecting position is instructed. Alternatively, a detecting position may be determined in the following way: a detecting position is firstly appointed and a determination as to whether detection can be performed in the appointed detecting position is automatically performed, whereby a detecting position is obtained.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

Industrial Applicability

According to the bending angle detector of the invention, a bending angle of a workpiece can be detected with high accuracy by a simple mechanism, while calibrating uncertain factors such as lens distortion and variations in the image receptor. This bending angle detection does not involve measurement of the distance between a workpiece and the photographing means, measurement of the beam projecting angle of the projecting means, nor complicated arithmetic operation.

According to the first straight line extracting device for use with a bending angle detector, main pixels in the bright zone of a gray-scale image are obtained without carrying out binary conversion and from the main pixels, a main straight line is extracted, so that the accuracy of the straight line extraction can be markedly improved.

According to the second straight line extracting device for use with a bending angle detector, the photographing means is so disposed that the lower bender is photographed and a straight line component linked to the image of the lower bender is extracted, so that even if a workpiece which has been already bent is bent again or even if images other than the image of a workpiece are included in a photographed image, only a straight line required for bending angle detection can be extracted. This markedly increases the accuracy of the bending angle detection. Further, there is no need to obtain other data, so long as a straight line at the bottom end of the image and a straight line linked to the line at the bottom end are obtained. This contributes to saving of the time required for calculation.

With the bending angle detecting position setting device of the invention, a potential position for bending angle detection can be smoothly set, so that high-accuracy bending processing can be achieved.

We claim:

1. A bending angle detector wherein a bending angle of a sheet-like workpiece, which is bent into a desired angle, is detected by image processing, comprising:

(a) projecting means for projecting light onto the workpiece at a specified projecting angle to form a linear projected light image on a surface of the workpiece;

(b) photographing means for photographing the surface of the workpiece on which said linear projected light image has been formed by said projecting means;

(c) projected light image detecting means for detecting an inclination angle and a position of said linear projected light image in an image produced by said photographing means;

(d) memory means for storing 1) first data on an actual inclination angle of a specimen in correspondence with 2) second data on an inclination angle and a position of an image of the specimen produced by said photographing means when said projecting means projected light onto the specimen at said specified projecting angle, the actual inclination angle being preliminarily given; and (e) calculating means for obtaining, by arithmetic operation, the bending angle of the workpiece by accessing said first and second data stored in the memory means, using the inclination angle and the position of said linear projected light image detected by said projected light image detecting means, wherein said projected light image detecting means includes a straight line extracting device which extracts a main straight line from a bright zone of a gray-scale image, said straight line extracting device including:

(i) brightness detecting means for detecting brightness of each of a plurality of pixels which constitute a gray-scale image;

(ii) main pixel calculating means for (1) performing arithmetic operation on a specified scanning axis in an image coordinate system, to obtain main pixel associated with an optical axis of a bright zone from a distribution of the brightness of the pixels aligned on a scanning axis detected by said brightness detecting means and (2) repeatedly performing the arithmetic operation on other scanning axes which are arranged at specified intervals, wherein a plurality of main pixels are obtained; and (iii) main straight line calculating means for obtaining a main straight line of the bright zone from a plurality of main pixels obtained by said main pixel calculating means.

2. The bending angle detector as set forth in claim 1, wherein said second data includes a correction value based upon the angle of the specimen based upon the inclination angle and position of the specimen image.

3. A straight line extracting device for use with a bending angle detector in a bending machine for bending a sheet-like workpiece into a desired angle by pinching and pressing the workpiece placed on a lower bender with an upper bender, said straight line extracting device comprising:

(a) projecting means for projecting, at a specified projecting angle, light onto the workpiece and onto a part of the lower bender on which the workpiece is placed, such that a linear projected light image is formed on surfaces of the workpiece and the lower bender;

(b) photographing means for photographing the surfaces of the workpiece and the lower bender on which said linear projected light image has been formed by said projecting means;

(c) point sequence forming means for performing binary conversion and image thinning process on an image produced by said photographing means, therein forming a sequence of points which is representative of the image having a unit which is a pixel;

(d) straight line component extracting means for extracting a straight line component associated with the image of the workpiece from said sequence of points obtained by said point sequence forming means, said straight line component being linked to a straight line component associated with the image of the lower bender, wherein said straight line component extracting means determines that a straight line crossing a bottom end of the image produced by said photographing means is said straight line component associated with the image of the lower bender, and wherein said straight line component extracting means extracts Said straight line component associated with the image of the workpiece in such a way that (i) a straight line connecting a first point located at a bottom end of the image produced by said photographing means and a second point adjacent to said first point is firstly obtained; (ii) a specified width is allowed to said straight line therein determining a specified straight line region; (iii) when a third point adjacent to said second point is within said straight line region, a straight line including said third point is obtained and a straight line region is again determined in a same way as described in step (ii); (iv) when there appears a point which is not included in the corresponding straight line region, a line segment between said first point and a point just before said point which is not included in the straight line region is determined as a straight line component; and (e) projected light image detecting means for detecting inclination angle and position of said linear projected light image of the workpiece in the image produced by said photographing means, based on said straight line component extracted by said straight line component extracting means.

4. The bending angle detector as set forth in claim 1, wherein said calculating means calculates the bending angle of the workpiece by interpolating the data stored in the memory means.

5. The bending angle detector as set forth in claim 1, 2, or 4, wherein said projecting means and said photographing means are disposed at least on one side of a bending line of the workpiece.

6. The bending angle detector as set forth in claim 5, wherein said projecting means projects a slit light or a plurality of aligned spot lights, therein forming the linear projected light image on the surface of the workpiece.

7. The straight line extracting device for use with a bending angle detector as set forth in claim 3, wherein said point sequence forming means deletes points at specified intervals and forms said sequence of points representative of the image based on remaining points.

8. The bending angle detector as set forth in claim 1, which further comprises noise eliminating means for eliminating noise from the gray-scale image prior to the detection of the brightness of each pixel by said brightness detecting means.

9. The bending angle detector as set forth in claim 8, wherein said noise eliminating means eliminates noise by subtracting the brightness of pixels before formation of the gray-scale image from the brightness of pixels after the formation.

10. The bending angle detector as set forth in claim 8, wherein said noise eliminating means eliminates noise by making brightness values below a specified threshold zero.

11. The bending angle detector as set forth in claim 8, wherein said noise eliminating means eliminates noise by making the brightness values of isolated pixels zero, adjacent pixels of each isolated pixel having a brightness of zero.

12. The bending angle detector as set forth in claim 1, wherein said main pixel calculating means obtains a pixel having a highest brightness from pixels aligned on the specified scanning axis as the main pixel.

13. The bending angle detector as set forth in claim 1, wherein said main pixel calculating means obtains a barycenter in the distribution of the brightness of pixels aligned on the specified scanning axis as the main pixel.

14. The bending angle detector as set forth in claim 1, wherein said main pixel calculating means obtains a half-width of each pixel from the distribution of the brightness of pixels aligned on the specified scanning axis and then obtains a central value of the half-width values as the main pixel.

15. The bending angle detector as set forth in claim 1, wherein the main straight line calculating means obtains said main straight line by calculating an approximate straight line from a plurality of main pixels, using a least square method.

16. The bending angle detector as set forth in claim 15, wherein said main straight line calculating means sets a specified straight line region by allowing a specified width to the approximate straight line; deletes a pixel which is a furthest from the straight line region; and repeatedly performs the arithmetic operation for obtaining an approximate straight line based on remaining pixels until all pixels are within a straight line region, wherein the main straight line is determined.

17. The straight line extracting device for use with a bending angle detector as set forth in claim 3, wherein said straight line component extracting means determines a line segment consisting of two points is unnecessary and deletes the line segment consisting of two points.

18. The straight line extracting device for use with a bending angle detector as set forth in claim 3, 7, or 17 wherein said projecting means and said photographing means are disposed at least on one side of a bending line of the workpiece.

19. The straight line extracting device for use with a bending angle detector as set forth in claim 18, wherein said projecting means projects a slit light or a plurality of aligned spot lights, therein forming said linear projected light image on the surfaces of the workpiece and the lower bender.

* * * * *